United States Patent
Chizi et al.

(10) Patent No.: US 10,798,066 B2
(45) Date of Patent: Oct. 6, 2020

(54) SYSTEM FOR RETRIEVING PRIVACY-FILTERED INFORMATION FROM TRANSACTION DATA

(71) Applicant: KBC Groep NV, Brussels (BE)

(72) Inventors: Barak Chizi, Woluwe (BE); Jeroen D'Haen, Sint-Amandsberg (BE); Tomas Klinger, Prague (CZ); Laura Nurski, Bierbeek (BE); Johan Thijs, Betekom (BE); Erik Van Goolen, Begijnendijk (BE)

( * ) Notice: Subject to any disclaimer, the term of this patent is extended or adjusted under 35 U.S.C. 154(b) by 219 days.

(21) Appl. No.: 16/301,241

(22) PCT Filed: Feb. 21, 2017

(86) PCT No.: PCT/EP2017/053921
§ 371 (c)(1),
(2) Date: Nov. 13, 2018

(87) PCT Pub. No.: WO2017/194214
PCT Pub. Date: Nov. 16, 2017

(65) Prior Publication Data
US 2019/0166102 A1    May 30, 2019

Related U.S. Application Data

(60) Provisional application No. 62/335,934, filed on May 13, 2016.

(30) Foreign Application Priority Data

May 13, 2016 (EP) .................... 16169721

(51) Int. Cl.
*H04L 29/06* (2006.01)
*H04L 9/06* (2006.01)
(Continued)

(52) U.S. Cl.
CPC ..... *H04L 63/0421* (2013.01); *G06Q 30/0641* (2013.01); *H04L 9/0643* (2013.01); *H04L 9/0894* (2013.01)

(58) Field of Classification Search
CPC .......... G06F 21/6245; H04L 63/0421; H04W 12/02; H04W 12/00
See application file for complete search history.

(56) References Cited

U.S. PATENT DOCUMENTS 7,269,578 B2 *  9/2007  Sweeney ............. G06F 21/6245
                                                      705/74
8,204,929 B2 *  6/2012  Roginsky ............ G06F 21/6245
                                                      709/201
(Continued)

FOREIGN PATENT DOCUMENTS

EP    2416271    2/2012
EP    2653984    10/2013
(Continued)

OTHER PUBLICATIONS

Eurostat: "Manual on Disclosure Control Methods", XP055288634, Jan. 1, 1996, retrieved form the Internet: http://ec.europa.eu/eurostat/ramon/statmanuals/files/manual_on_diclosure_control_methods_1996.pdf (Retrieved on Jul. 14, 2016), pp. 7-42.
(Continued)

*Primary Examiner* — Ali S Abyaneh
(74) *Attorney, Agent, or Firm* — Hodgson Russ LLP

(57) ABSTRACT

The current invention relates to a computing system for obtaining a privacy-filtered response to a query of a user, the computing system comprising a server, the server comprising a server processor, tangible non-volatile server memory, server program code present on said server memory for instructing said server processor; a computer-readable medium, the computer-readable medium comprising a database, said database comprising privacy settings comprising
(Continued)

a privacy threshold; a device, said device comprising a device processor, tangible non-volatile device memory, device program code present on said device memory for instructing said device processor; wherein said server is configured for receiving raw transaction data from an external source such as a raw transaction database or a raw transaction feed.

15 Claims, 14 Drawing Sheets

(51) Int. Cl.
*G06Q 30/06* (2012.01)
*H04L 9/08* (2006.01)

(56) References Cited

U.S. PATENT DOCUMENTS

| | | | |
|---|---|---|---|
| 8,626,705 | B2 | 1/2014 | Barrett et al. |
| 2013/0297504 | A1* | 11/2013 | Nwokolo ............... G06Q 20/36 705/41 |
| 2014/0089041 | A1 | 3/2014 | Vedabrata et al. |
| 2014/0281572 | A1 | 9/2014 | Wang et al. |
| 2015/0100495 | A1* | 4/2015 | Salama ............... G06Q 20/3829 705/65 |
| 2015/0312246 | A1* | 10/2015 | Mattsson ................ G06F 16/84 726/26 |
| 2016/0142378 | A1* | 5/2016 | Sedayao ................. G06F 21/60 726/26 |
| 2016/0344702 | A1* | 11/2016 | Ukena ................. H04L 63/0421 |

FOREIGN PATENT DOCUMENTS

| | | |
|---|---|---|
| EP | 3244336 | 11/2017 |
| WO | 2010141270 | 12/2010 |
| WO | 2015077542 | 5/2015 |

OTHER PUBLICATIONS

International Preliminary Report on Patentability, dated Aug. 3, 2018, in PCT Application No. PCT/EP2017/053921, 20 pages.
International Search Report issued in PCT Application No. PCT/EP2017/053921, dated Mar. 22, 2017, 4 pages.
Written Opinion issued in PCT Application No. PCT/EP2017/053921, dated Mar. 22, 2017, 5 pages.

* cited by examiner

| Account | Timestamp | Amount | Name Store | MCC |
|---|---|---|---|---|
| 42100023 | 2015-07-08-15.26.18 | 35,12 | Waldi | 55548 |
| 42100023 | 2015-07-08-18.14.05 | 4,99 | Pizza Romeo | 33210 |
| 42100023 | 2015-07-09-07.15.21 | 10 | Z Bakery | 65332 |
| 42100023 | 2015-07-10-07.14.13 | 10 | Z Bakery | 65332 |
| 42100655 | 2015-07-08-13.23.33 | 144,01 | Waldi | 55548 |

| Account | Timestamp | Amount | Name Store | MCC |
|---|---|---|---|---|
| 5BAD9EM | 2015-07-08-15.26.18 | 35,12 | Waldi | 55548 |
| 5BAD9EM | 2015-07-08-18.14.05 | 4,99 | Pizza Romeo | 33210 |
| 5BAD9EM | 2015-07-09-07.15.21 | 10 | Z Bakery | 65332 |
| 5BAD9EM | 2015-07-10-07.14.13 | 10 | Z Bakery | 65332 |
| 88JH321 | 2015-07-08-13.23.33 | 144,01 | Waldi | 55548 |

FIG. 7

| Account | Firstname | Lastname | Gender | Age | Address | City | Income |
|---|---|---|---|---|---|---|---|
| 42100023 | Thomas | Zinger | M | 29 | Nulsebaan | Leuven | 55.000 |
| 42100655 | Maria | Longer | F | 46 | Haagstraat | Namen | 62.000 |
| 54220055 | Dirk | Poel | M | 38 | Bergstraat | Berchem | 88.000 |

| Account | Gender | Age | City | Income |
|---|---|---|---|---|
| 5BAD9EM | M | 29 | Leuven | 55.000 |
| 88JH321 | F | 46 | Namen | 62.000 |
| AAO9MNJ | M | 38 | Berchem | 88.000 |

FIG. 8

| Account | Gender | Age | City | Income |
|---|---|---|---|---|
| 5BAD9EM | M | 29 | Leuven | 55.000 |
| 88JH321 | F | 46 | Namen | 62.000 |
| AAO9MNJ | M | 38 | Berchem | 88.000 |

| Account | Gender | Age | City | Income |
|---|---|---|---|---|
| 5BAD9EM | M | [20,40[ | Leuven | 55.000 |
| 88JH321 | F | [40,60[ | Namen | 62.000 |
| AAO9MNJ | M | [20,40[ | Berchem | 88.000 |

| Name Store | Avg. Amount | Prop. Males | Avg. Income | Avg. Family Size | Prop. Single |
|---|---|---|---|---|---|
| Waldi | 35,32 | 0,13 | 39.021 | 4,01 | 0,33 |
| Pizza Romeo | 16,33 | 0,65 | 32.155 | 1,3 | 0,9 |
| Z Bakery | 4,15 | 0,44 | 54.654 | 2,1 | 0,32 |

| Name Store | Avg. Amount | Avg. Income | Avg. Family Size |
|---|---|---|---|
| Waldi | 35,32 | 39.021 | 4,01 |
| Pizza Romeo | 16,33 | 32.155 | 1,3 |
| Z Bakery | 4,15 | 54.654 | 2,1 |

SYSTEM FOR RETRIEVING PRIVACY-FILTERED INFORMATION FROM TRANSACTION DATA

TECHNICAL FIELD

The invention relates to a system for retrieving privacy-filtered information from transaction data and other data sources.

BACKGROUND

In today's globally networked society person-specific data is created at a dazzling pace. A part of this data is transaction data. The latter comprises amongst others financial transaction data, which is confidential by nature, and can therefore not be made available publicly in its raw original form. A known solution to guarantee confidentiality is by reporting only aggregate statistical information on a very general level. This however eliminates a lot of the potential the data offers. Producing anonymous data that remains specific enough to be useful is often a very difficult task, and practice today tends to either incorrectly believe confidentiality is maintained when it is not or to produce data that is practically useless.

U.S. Pat. No. 7,269,578 discloses a concept for anonymizing data according to an anonymity criterion called k-anonymity. Given person-specific data organized in fields and entries, the data is said to have the k-anonymity property if the information for each person contained in the data cannot be distinguished from at least k−1 individuals whose information also appears in the data set. The concept disclosed in U.S. Pat. No. 7,269,578 is however limited to the anonymization of data, without consideration of the further processing nor the specific nature of the data. In contrast to this, the present invention is not limited to anonymizing data and includes several other key aspects concerned with the processing of the data. Furthermore, the concept disclosed in this document is adapted for data of a specific nature, i.e. transaction data and data relating to it.

U.S. Pat. No. 8,626,705 discloses a concept for determining aggregated transaction level data for specific group characteristics. The method involves an aggregator server determining a plurality of aggregates from parsed transaction data. The concept disclosed in U.S. Pat. No. 8,626,705 is limited to the assembly of aggregates without tackling the problem of anonymity. Opposed to this, the invention disclosed in this document provides a systematic approach to aggregation that incorporates anonymity as an integral part, both through tokenization (local anonymization) and through a complementary anonymization step that takes into account the entire transaction data aggregate.

US 2014/0089041 discloses an apparatus for identifying misclassified customers in a customer database. The apparatus may include a receiver configured to receive information corresponding to a plurality of customers and information corresponding to a plurality of transactions. The apparatus may additionally include a processor configured to calculate a mean transaction value and a standard deviation from the mean transaction value, wherein the mean transaction value is calculated using the plurality of transactions. The concept disclosed in US 2014/0089041 is limited to the maintenance of a customer database relating to transaction data, without incorporating any aspect of anonymity. In contrast, the present invention incorporates a strategy to handle anonymity explicitly and systematically. Additionally, embodiments of the present invention allow for maintenance of the customer database by incorporating real-time data in the raw transaction data, allowing to update customer data by means of rules, preferably automated rules.

WO 2010/141270 discloses a system and method to summarize transaction data via cluster analysis and factor analysis. In one aspect, a method includes identifying at least one set of clusters based on a cluster analysis of transaction records to group entities, identifying a plurality of factors based on a factor analysis of the transaction records to reduce correlations in spending variables, classifying an entity according to the at least one set of clusters, and computing values of the factors based on the transaction records of the entity. The concept disclosed in WO 2010/141270 is limited to the aggregation of transaction data without addressing the problem of anonymity. Opposed to this, the present invention systematically incorporates anonymity in its modus operandi.

There remains a need in the art for an improved method and system to derive anonymized transaction data from raw transaction data. Furthermore, there remains a need in the art for a method that combines aggregation of transaction data with anonymization of transaction data. Related, there is a need for obtaining privacy-filtered responses to queries relating to raw transaction data.

The present invention aims to resolve at least some of the problems mentioned above.

The invention thereto aims to provide a method to derive tailored transaction data from raw transaction data, addressing both the need for aggregation and the need for anonymization. Furthermore, the invention aims to provide a computing system, a tailored transaction data product and a computer program product relating to said method. Related, the invention aims to provide a computing system for obtaining a privacy-filtered response to a query of a user.

SUMMARY OF THE INVENTION

According to a first aspect, the present invention relates to a computing system for obtaining a privacy-filtered response to a query of a system user, the computing system comprising

- a server, the server comprising a server processor, tangible non-volatile server memory, server program code present on said server memory for instructing said server processor;
- a computer-readable medium, the computer-readable medium comprising a database, said database comprising privacy settings comprising a privacy threshold;
- a device, said device comprising a device processor, tangible non-volatile device memory, device program code present on said device memory for instructing said device processor;

wherein said server is configured for receiving raw transaction data from an external source such as a raw transaction database or a raw transaction feed, said raw transaction data comprising a plurality of raw transactions associated with a plurality of users, wherein said server is configured for receiving said query of said system user via said device;

said computing system carrying out a method for obtaining said privacy-filtered response to said query of said system user, said query relating to a company comprising one or more stores, said company relating to a plurality of products/services offered to one or more users via said one or more stores, at least one of said plurality of products/services relating to one or more brands, said query comprising query-related information such as a store name or a brand name, said method comprising the steps of:

(A) receiving said query from said system user via said device, said query relating to at least one store and/or at least one brand;
(B) querying said raw transaction data based on said query, obtaining raw query results;
(C) processing said raw query results, obtaining a response;
(D) returning said response to said system user via said device;

characterized in that, said database comprises business data, said business data comprising user information and/or company information; in that said response concerns said privacy-filtered response; and in that said processing in step (C) comprises the steps of (C.1) extending said raw query results with extension data based at least on said business data and preferably based on said query-related information, obtaining enriched transaction data;
(C.2) filtering said enriched transaction data based at least on said privacy threshold, obtaining said privacy-filtered response;

whereby said enriched transaction data and said privacy-filtered response are organized in fields and entries; and whereby said filtering in step (C.2) comprises a generalization of at least one entry of said enriched transaction data for preventing identification of a user relating to said entry.

Hereby, the system user is the person or entity providing the query to the system, whereas users, on the other hand, are the persons or entities associated with raw transactions present in the raw transaction data.

A key advantage of such a system is that it provides the system user with query results that are superior in quality when compared to those obtained from a prior art system. In prior art systems, raw transaction data is typically privacy-filtered "beforehand", regardless of the query performed on it. While such an approach may be adequate to prevent security risks relating to those third parties and to guarantee privacy, this inevitably results in oversimplification of the data, with overly generic query responses, at least if a sufficient privacy level is maintained. Opposed to this, the system according to the present invention is granted access to the actual raw transaction data, allowing for querying on the original raw transaction data before any privacy filtering takes place. This leads to more accuracy for the raw query results, in which the original relations between different transactions are intact. For instance, individual users that can be identified in the raw transaction results will still be identifiable in the raw query results. Moreover, the system maintains a database containing additional business data, which may in itself be confidential. Therefore, it might be advantageous to use this business data without revealing it entirely to the system user. By extending the raw transaction data with this business data before any privacy filtering takes place, a much more accurate joining of the raw transaction data and the business data is possible. In other words, the privacy filtering is done "as late as possible", and "in one run", corresponding to step (C.2). Hereby, said one run may comprise one or more consecutive steps. For example, store names, brand names and other data such as age or average income can still be associated to an individual user if desired just before privacy filtering takes place. By performing the privacy filtering entirely in one run and as late as possible, the information is only filtered to the extent needed to attain sufficient privacy. Hereby, the privacy filtering concerns the generalization of at least one entry of said enriched transaction data. Generalization implies the replacing of a specific entry by a more general entry. Hereby, the specific entry can be attributed to a small group of users. Opposed to this, the more general entry concerns a value or a description that is applicable to a larger group of users. In other instances, the specific entry may even be attributed to a single individual user. In such a case, the related, more general entry is applicable also to other users different from said individual user. Hereby, the minimal number of users to which the more general entry applies is linked directly or indirectly to the privacy threshold; in a preferred embodiment described below this concerns a parameter relating to k-anonymity and/or t-closeness. While the privacy-filtered response no longer contains references to individual users, the entries associated with specific fields such as stores and brands will be calculated more accurately than in a system where the privacy filtering is done partly or entirely before the extending of data, for instance by providing transaction data that is already privacy-filtered beforehand. A related advantage of the present system is that the level of detail that is preserved in the privacy-filtered response is in itself adjustable, via said privacy threshold. In a preferred embodiment where the privacy threshold concerns a single scalar value, a low privacy threshold corresponds to a lower level of privacy and a higher level of detail, whereas a high privacy threshold corresponds to a higher level of privacy and a lower level of detail. In embodiments where the privacy threshold concerns a set of two or more values, preferably at least one of said two or more values corresponds to a lower level of privacy and to a higher level of detail if it is set low, and to a higher level of privacy and a lower level of detail if it is set high.

In a preferred embodiment of the present invention, said filtering in step (C.2) relates to k-anonymity and/or t-closeness, said k-anonymity involving a parameter k, said t-closeness involving a parameter t, wherein said parameter k and said parameter t are based at least partly on said privacy threshold. This has the advantage that well-known criteria are used for the assessment of privacy, with well-known advantages and drawbacks. In a preferred embodiment, the privacy-filtered response adheres to k-anonymity with parameter value k if each user involved in the privacy-filtered response cannot be distinguished from at least k−1 other users also involved in the privacy-filtered response. Furthermore, in another preferred embodiment, the privacy-filtered response adheres to t-closeness with parameter value t if all aggregates considered in the privacy-filtered response adhere to t-closeness. Hereby, an aggregate adheres to t-closeness with parameter value t if the distance between the distribution of a sensitive field in the aggregate and the sensitive feature in the whole dataset is not larger than t. Hereby, the distance metric used for measuring distance can be chosen appropriately for the dataset at hand, for instance the earth mover's distance metric. In a preferred embodiment, the whole dataset concerns the entire combination of all raw transaction data and all business data, in an alternative embodiment the whole dataset is only a subset of said entire combination. Taking into account the properties of parameters k and t, a relation can be chosen between the privacy threshold and said parameters. In a preferred embodiment, the privacy threshold comprises two distinct values equal to the parameter k and the parameter t, respectively.

In a preferred embodiment, said query relates to a store-specific selection of raw transactions relevant to at least one store; whereby said business data comprises demographic data and/or financial data and/or profile data and/or habit data relating to users associated with raw transactions belonging to said store-specific selection. This is advantageous since it provides the system user with detailed insights on the activities of one or more stores, and how these activities compare to other stores. A related example involving a customer profiling module is discussed below. Thereby, reference is made to FIG. 19.

In another preferred embodiment of the present invention, said query relates to a brand-specific selection of raw transactions relevant to at least one brand; and in that said business data comprises demographic data and/or financial data and/or profile data and/or habit data relating to users associated with raw transactions belonging to said brand-specific selection. This is advantageous because it provides the system user with insights on the activities and the market share relating to a specific brand or group or brands. A related example involving a market insights module is discussed below. Thereby, reference is made to FIG. 20.

In another preferred embodiment, said filtering in step (C.2) comprises the steps of
- (i) tokenizing said enriched transaction data with a token, obtaining aggregation-ready transaction data;
- (ii) aggregating said aggregation-ready transaction data, obtaining aggregated transaction data, whereby each portion of said aggregated transaction data belongs to at least one provisional aggregate;
- (iii) performing a threshold test for each of said provisional aggregates and discarding a portion of the aggregated transaction data belonging to aggregates for which the number of unique users is below said threshold parameter, obtaining threshold-tested transaction data, whereby each portion of said threshold-tested transaction data belongs to at least one threshold-tested aggregate;
- (iv) performing an anonymity test for each of said threshold-tested aggregates and obtaining anonymity-tested transaction data, moving to step (v) if negative and jumping to step (vi) in the opposite case;
- (v) reducing the level of detail of said anonymity-tested transaction data and obtaining aggregation-ready transaction data, jumping to step (ii);
- (vi) categorizing said anonymity-tested transaction data using a rule, obtaining categorized transaction data;
- (vii) deriving said tailored transaction data from said categorized transaction data.

The advantages of said privacy filtering according to steps (i) to (vii) are similar to those described in this document for the steps (a) to (g).

In another preferred embodiment, said system is further configured for generating a visualization belonging to said privacy-filtered response, said visualization comprising a comparison with respect to two or more fields comprised in said privacy-filtered response. This is advantageous since it facilitates the system user when executing subsequent queries on the system.

In a preferred embodiment, said system further comprises a web interface comprising a graphical user interface (GUI) for display to said system user via said device. This facilitates the system user in operating the system.

According to another aspect of the invention, the present invention provides a privacy-filtered response product produced by the system, said privacy-filtered response product comprising any or any combination of the following: said print-out of said privacy-filtered response, said electronic data file comprising said privacy-filtered response. This is advantageous since it allows to export insights retrieved from the system on a physical medium that can then be used partly or entirely independently from the system.

According to another aspect of the invention, the invention provides a computer program product for a device belonging to a system for obtaining a privacy-filtered response to a query of a system user according to the present invention, said system comprising
- a server, the server comprising a server processor, tangible non-volatile server memory, server program code present on said server memory for instructing said server processor;
- a computer-readable medium, the computer-readable medium comprising a database, said database comprising privacy settings comprising a privacy threshold;
- a device, said device comprising a device processor, tangible non-volatile device memory, device program code present on said device memory for instructing said device processor;

wherein said server is configured for receiving raw transaction data from an external source such as a raw transaction database or a raw transaction feed; wherein said server is configured for executing a server method for obtaining a privacy-filtered response to a query of a system user according to following steps:
- receiving said query of said user via said device;
- querying said raw transaction data based on said query, obtaining raw query results;
- extending said raw query results based at least on said query-related information with extension data, obtaining enriched transaction data;
- filtering said enriched transaction data based at least on said privacy threshold, obtaining said privacy-filtered response;

said device comprising said computer program product, said computer program product comprising at least one computer-readable medium comprising computer-readable program portions, said program portions containing instructions for executing a device method for obtaining said privacy-filtered response to said query of said system user, said query relating to a company comprising one or more stores, said company relating to a plurality of products/services offered to one or more users via said one or more stores, at least one of said plurality of products/services relating to one or more brands, said query comprising query-related information such as a store name or a brand name, said device method comprising the steps of:
- (01) receiving said query from said system user via said device, said query relating to at least one store and/or at least one brand;
- (02) sending said query to said server;
- (03) letting said server process said query;
- (04) receiving a response on said device from said server;
characterized in that, said database comprises business data, said business data comprising user information and/or company information; in that said response concerns said privacy-filtered response; and in that said processing in step (03) comprises the steps of
- extending said raw query results with extension data based at least on said business data and preferably based on said query-related information, obtaining enriched transaction data;
- filtering said enriched transaction data based at least on said privacy threshold, obtaining said privacy-filtered response;

whereby said enriched transaction data and said privacy-filtered response are organized in fields and entries; and whereby said filtering of said enriched transaction data comprises a generalization of at least one entry of said enriched transaction data for preventing identification of a user relating to said entry.

The advantages of such a computer program product are similar to those of the system and method according to the present invention.

In an alternative embodiment of the present invention, the querying of the data does not take place on the raw transaction data. Instead, the raw transaction data is first extended by means of said business data, obtaining a first data set. The query is only executed on this first data set, obtaining a second data set. This second data set is then fed to the privacy-filtering step. Also in this alternative embodiment, privacy filtering takes place in a single run and "as late as possible".

DESCRIPTION OF FIGURES

FIG. 7 shows a seventh embodiment relating to aspects of the present invention.

FIG. 8 shows an eighth embodiment relating to aspects of the present invention.

DETAILED DESCRIPTION OF THE INVENTION

Figure 1:
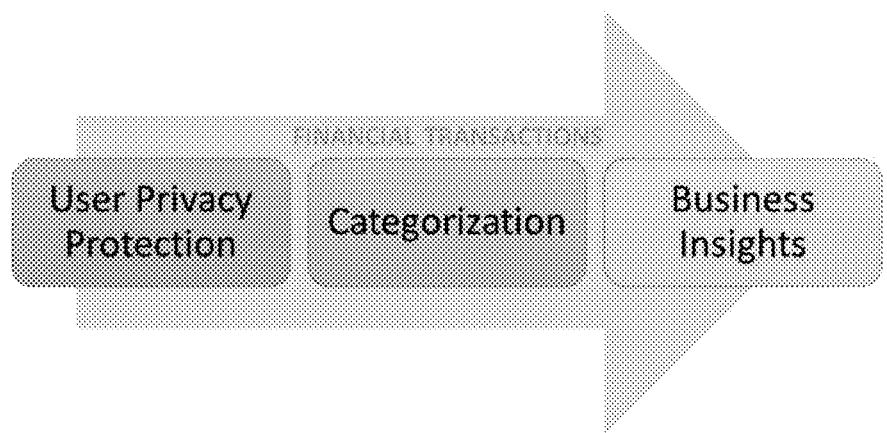
FIG. 1 illustrates a first embodiment relating to the present invention.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The expression "business insight" relates to quantitative and/or qualitative observations that are provided by the system in response to the query of the system user. Related, said privacy-filtered response may comprise one or more business insights.

In the context of this document, the expression "level-of-interest (LOI) entity" is interchangeable with "aggregate" and "microaggregate". Furthermore, the term "field" and "attribute" are interchangeable. The term "entry" refers to a content of a field, whereby said content may be a numerical value but also another type of value such as a Boolean variable or a character string.

In the context of this document, the terms "privacy filtering", "privacy mechanism" and "anonymity concept" are interchangeable. Furthermore, the term "client" may refer to either a system user or a user, depending on the context. For a user, the term "client" may for instance refer to the role of a customer in a store. For a system user, the term "client" may for instance refer to the role of a system provider client using the system that is provided by a system provider. The term "customer" may refer to a user, for instance in the role of a customer visiting a store. The terms "business data" and "other data" are interchangeable in this document, and relate to the concept of a "digital channel".

The expression "% by weight", "weight percent", "% wt" or "wt %", here and throughout the description unless otherwise defined, refers to the relative weight of the respective component based on the overall weight of the formulation.

Data anonymity encompasses several problems. One of the problems is that one cannot judge the anonymity of data in a simple intuitive way. In some instances it may be simple, e.g. when a bank account number is contained within the data. In such a case, any person with inside knowledge (e.g., a staff member of a store) may look for further information on a specific user that is a customer of that store. To a lesser degree, however, also a zip code identifies individuals since it is may be almost unique or even unique within a given context, e.g. for a single store. Hereby, it is important to note that the unique feature (such as e.g. the zip code) may not be known beforehand, and depends on the context. It could be based on some detail or combination of details available to a person with inside knowledge, or knowledge about the data source from some other source.

Special care should be taken in tokenizing the data. Indeed, tokenizing e.g. a bank account number makes identifying individuals more difficult, but still cannot guarantee the data are anonymous. If a person with inside knowledge (e.g., a staff member of a shop where several transactions took place) has access to the tokenized version of the bank account number together with a plurality of transactions associated with the bank account number, then said person may identify individual users by the combination of transactions (e.g. articles bought). In one embodiment of the present invention, this problem is circumvented by letting more than one token correspond with a single bank account number.

Determining an appropriate bin size to realize anonymity is not a simple task. It depends on the frequencies of characteristics found within the data as well as within other sources for reidentification. In addition, the motivation and effort required to reidentify release of data in cases where virtually all possible users can be identified must be considered. For example, if data are released that map each transaction to ten possible users, and the ten users can be identified, then all ten users may be contacted or visited in an effort to locate the actual users. Likewise, if the mapping is 1 in 100, all 100 could be phoned because visits may be impractical, and in the mapping of 1 in 1,000, a direct mail campaign could be employed. The amount of effort the recipient is willing to spend depends on their motivation. Some transactions may be more privacy-sensitive than others, and valuable data will merit more effort. In an embodiment of the present invention where the threshold parameter concerns a single numerical value, this effect is countered amongst others by choosing the threshold parameter in the threshold-test in step (C) sufficiently large. In another embodiment of the present invention, this effect is countered by setting a privacy threshold sufficiently large by setting the parameter k and/or the parameter t to appropriate values.

While the examples included below all address embodiments relating to financial transactions, the present invention is not limited to any specific type of transactions. For instance, the concepts disclosed in this document equally apply to transactions in telecommunications relating to call detail records (CDR) or xDR, where x may stand for Call/Transaction/Session.

The invention allows system users to extract business insights from the transactional and other data sources with queries. An example of such a query is "what is the profile of males between 20-25 in store A". This leads to potential privacy issues and concerns. If queries are too specific, individuals can be singled out. This occurs when a set of features is combined in such a way that it can only point to a specific individual user. For example, in the extreme case a national identification number of an individual user is provided. As a result, this individual user can be uniquely identified. Identifying features such as social security numbers, names, addresses, etc. are called key attributes or key fields. Key attributes are and should always be deleted and/or filtered from datasets as they pose clear privacy concerns.

Besides key attributes data may contain quasi-identifiers and sensitive attributes. Quasi-identifiers are features such as zip code, gender, age, etc. Sensitive attributes are features such as medical data or income. Quasi-identifiers pose a privacy issue when their combination allows the singling out of an individual user. A combination of quasi-identifiers creates groups. If a group contains only a single user, then the sensitive attributes of that group can be uniquely linked to a single user.

In a preferred embodiment, k-anonymity is applied to prevent the possibility of singling out a single user, preferably in combination with t-closeness. Each group or aggregate of individual users, regardless of the definition of the group or aggregate, should relate at least to k individual users. As a result, if it is known that an individual user is part of a group, one can only say with a certain probability, dependent on k, something about the sensitive attributes of this individual user. In a preferred embodiment, k-anonymity is ensured by means of microaggregation, possibly in combination with t-closeness. Microaggregation consists of two steps: partitioning and aggregation. Partitioning groups the raw microdata into clusters based on specific quasi identifiers. Aggregation computes a value for every other (sensitive) attribute and replaces the original value with its aggregated value. This could be, for example, the mean or median (e.g. median income per store) for numeric data and the mode or proportion for categorical data (e.g. proportion of singles per store). Applied on the query example "what is the profile of males between 20-25 in store A", one could, for example, get the following business insights: "Males between 20-25 in store A have an average income of 2 400 euro, 12% are single and they spent 23 euro on average."

In a preferred embodiment the system takes into account that the more specific a query gets, the smaller each outcome group or cluster will be. Therefore, the system is provided with a privacy mechanism. The privacy mechanism may include any or any combination of k-anonymity, t-closeness, k-concealment and possibly other privacy mechanisms. Hereby, k-anonymity prevents that insights on groups with less than k individual users are presented. Yet, queries on other groups can be compared to draw conclusions on the omitted group. This is especially clear when considering the example illustrated in FIG. 17 and discussed below. Accordingly, in a preferred embodiment of the system, microaggregation and/or aggregation is performed with a k-anonymity check across subgroups of the same group, e.g. a group corresponding to a company branch, to prevent probabilistic conclusions.

In a preferred embodiment, privacy filtering according to the present invention relates to t-closeness, which may or may not be considered in combination with k-anonymity. This is motivated by the fact that a k-anonymity check alone is not sufficient to prevent probabilistic conclusions. The distribution of sensitive information can provide important information as well. Important is to what degree the distribution within a microaggregated group differs from the population. For example, if in a group 50% of the people have a specific disease, it does not seem to provide any sensitive information concerning that group. However, if in the overall population 99.99% of the people do not have the disease, the 50% is of course highly informative. As such, each microaggregated distribution should be compared to the distribution of the whole data. This is called the t-closeness principle. Each group is considered to have t-closeness if the distance between a sensitive feature in the group and the sensitive feature in the whole dataset is not larger than t. The way to calculate this distance depends on the case at hand and the features. Moreover, the value of t, and to the respect the value of k as well, is a trade-off between privacy on the one hand and utility on the other. In the extreme case that there can be no difference between the group feature distribution and the whole data feature distribution, no utility, i.e., no business insight, is retained.

According to a preferred embodiment, the system comprises one or more modules. The modules can be configured for running in any or any combination of the following operational modes:

1. As an internal app for system users such as branch workers, to be able to provide insights to bank clients.
2. As a web-application where access can be provided to system users.
3. As an installed application on said device such as a computer of the system user.

In a preferred embodiment, the system comprises a customer profiling module. In such a case, the users concern customers, and the system provides intelligence on the customers of a specific company. The customer profiling module can run one-off analyses, a batch mode or real-time streaming. Said customer profiling module preferably allows the system user to set up his/her branches/franchises for which he/she wants to receive the information or for which he/she wants a comparison. Related, the module preferably returns metrics on the branch performance and/or customer profiles and/or customer loyalty. The system user can use this information for marketing strategy, performance monitoring or campaign monitoring purposes. For example, the system user might want to see the evolution in sales or the customer base over time in one or more of his/her branches/franchises. Then the system considers the transactions of all the shop's customers, enriches it with their profiles such as age, purchasing power, area they are from or the products they have and runs the privacy checks. If those are OK, the system may return the insights to the system user. Furthermore, in a preferred embodiment, if the system user wants to see profiles of individual groups of shopping users (e.g. the loyal ones, the wealthy ones or the high-spenders), the system considers the transactions of all the shop's clients, enriches it with their profiles, microaggregates them into groups and runs the privacy checks. In an alternative embodiment, the system user may consider the information on what types of shops his/her customers usually go to or split its customer base according to shopping behavior. In that case, first, POI profiles are created by categorizing the POIs into higher level categories according to a categorization method and calculating shopping profiles on a customer basis. Subsequently, the system may follow its standard path, enriching the transactions in the given store of interest, (micro)aggregating and running the privacy checks. After those checks are passed, the insight may be provided to the system user. An example of a detailed schema of said customer profiling module is given in FIG. 19 and is discussed below.

In a preferred embodiment, the system comprises a market insight module. Such a module allows the system user to obtain intelligence about the market environment. In a preferred embodiment, this may run in a one-off analysis and/or a batch mode and/or real-time streaming. Hereby, a key matter is the definition of the market which depends on good categorization of all the POIs. For example, the system user might be interested in comparison of his POI to the competition or in seeing his total share of consumer budget. In this case all the transactions are taken into account and after the enrichment and privacy check, they can be aggregated to the POI level. Using the additional POI characteristics, the POIs are correctly categorized. Preferably, the insights are not created only for his/her own POI but also for the whole reference group (e.g. all the POIs of the same category) so that the system can make comparisons between these two. For example, the system user may get an insight about his customer base being younger or wealthier than the customer base of the whole industry. In a preferred embodiment, the market insight module is configured such that the privacy-filtered response can be further split on interesting profiles, e.g. the system user may be interested in how the characteristics of his most loyal customers compare with the most loyal customers of the competition. An example of a detailed schema of said market insight module is given in FIG. 20 and is discussed below.

According to another aspect of the present invention, which is not intended to limit the scope of the invention in any way, a method is provided for deriving tailored transaction data from raw transaction data, capable of aggregating as well as anonymizing the transaction data in a single unified approach. Specifically, the present invention provides a method for deriving tailored transaction data from raw transaction data, wherein said raw transaction data comprises a plurality of raw transactions associated with a plurality of users and is organized in fields and entries, said method comprising the steps of (a) tokenizing said raw transaction data with a token, obtaining aggregation-ready transaction data;

(b) aggregating said aggregation-ready transaction data, obtaining aggregated transaction data, whereby each portion of said aggregated transaction data belongs to at least one provisional aggregate;

(c) performing a threshold test for each of said provisional aggregates and discarding a portion of the aggregated transaction data belonging to aggregates for which the number of unique users is below said threshold, obtaining threshold-tested transaction data, whereby each portion of said threshold-tested transaction data belongs to at least one threshold-tested aggregate;

(d) performing an anonymity test for each of said threshold-tested aggregates and obtaining anonymity-tested transaction data, moving to step (e) if negative and jumping to step (f) in the opposite case;

(e) reducing the level of detail of said anonymity-tested transaction data and obtaining aggregation-ready transaction data, jumping to step (b);

(f) categorizing said anonymity-tested transaction data using a rule, obtaining categorized transaction data;

(g) deriving said tailored transaction data from said categorized transaction data.

Hereby, note that steps (a) to (g) are related and similar to steps (i) to (vii) as described in this document, with similar advantages.

In the context of the present invention, said raw transaction data is organized in fields and entries. This corresponds to a field-structured data representation. In one embodiment of the present invention, this data representation is a relational SQL database. In another embodiment of the present invention, this data representation may be a plurality of simple tables with a number of rows and columns, whereby each row is associated with a single instance, e.g. a single user or a single transaction, whereby each column is associated with a single field representing a distinct feature with feature name, e.g. the timestamp indicating the time at which a given instance was recorded, and whereby the actual data filling the table are said entries.

Hereby, said raw transaction data may be provided either in batch or in the form of a stream or feed. In an embodiment relating to a batch, the raw transaction data may concern for instance a database file or a static database that is available as input to be used. In an embodiment relating to a stream or feed, the raw transaction data may be delivered one by one as input to be used, e.g. after transfer over a network.

Hereby, said tokenizing in step (a) is aimed at excluding all identifying data, i.e. data that could identify an individual entity. Likewise, said tokenizing in step (i) is aimed at this. In an embodiment of the present invention, this may concern a bank account number. Tokenizing said identifying data is done by obfuscating the original data, in particular the entries for which the associated field is known to be privacy-sensitive and is therefore preferably anonymized. In a preferred embodiment of the present invention, tokenizing is done by means of a hashing algorithm that converts original raw entries associated with privacy-sensitive fields into tokens which cannot be easily connected to the original entries, unless by means of a token index. In a preferred embodiment of the invention, the hashing algorithm's functioning is such that two tokens generated by the hashing algorithm are non-identical unless the original entries are identical. In another preferred embodiment of the invention, two tokens generated by the hashing algorithm are always non-identical. In a preferred embodiment, the hashing algorithm is associated with a token index or hashing table which allows two-way conversion from original raw entry to token and vice versa, whereby said hashing table or token index is confidential and is not available publicly. In another embodiment, there is no hashing table or token index, and conversion is only possible from original entries to tokens, and not the other way around.

Said tokenization has the effect of promoting the anonymity of users. Indeed, by tokenizing privacy-sensitive entries present in the raw transaction data, a data set is obtained which does no longer contain explicit direct reference to individuals. While full anonymity comprises more than only tokenization, necessitating a separate anonymizing step (d), tokenization does yield a data set that is less privacy-sensitive. Likewise, while full anonymity comprises more than only tokenization, necessitating a separate anonymizing step (iv), tokenization does yield a data set that is less privacy-sensitive. This may have advantages in certain settings, for instance in a setting where the raw transaction data has to remain within the confines of a single department of an organization to guarantee strict confidentiality, while the output of the tokenization step, the so-called aggregation-ready transaction data, may be shared with a selection of other departments of said organization, because the sensitivity of the tokenized transaction data is lower than that of the raw transaction data.

Furthermore, step (b) comprises aggregating the transactions to make an abstraction of individual information. Likewise, step (ii) comprises aggregating the transactions to make an abstraction of individual information. Hereby, the raw transaction data is aggregated so that data belongs to one or more aggregates. Hereby, the aggregates are chosen such that they correspond to a certain point-of-interest level. In an embodiment of the present invention, this may e.g. be a store, a chain of stores, a group or a sector. This step is important because it helps structuring the transaction data, grouping the data according to aggregates that are meaningful to whom the tailored transaction data concern. Further, it is an important pre-processing step with respect to the threshold test performed in step (c). Similarly, it is an important pre-processing step with respect to the threshold test performed in step (iii).

Step (c) comprises a threshold test using a predefined threshold specifying a minimum number of users per aggregate. Likewise, step (iii) comprises a threshold test using a predefined threshold specifying a minimum number of users per aggregate. Specifically, the test verifies for each aggregate whether the number of users in an aggregate exceeds some value N, keeping only aggregates for which this is the case, and discarding aggregates for which this threshold value is not reached. In an embodiment of the invention, the different aggregates identify different stores, and the transaction data of stores is discarded if the number of unique customers visiting the store is too low. This has a beneficial effect for anonymity, since an excessively low number of users in a given aggregate may allow to infer the identity of individuals from the tailored transaction data, which is to be prevented for reasons of privacy.

Step (d) comprises an anonymity test. Likewise, step (iv) comprises an anonymity test. In a preferred embodiment of the present invention, this concerns the k-anonymity test as is known from literature and cited in this document. In an alternative embodiment, this comprises a t-closeness test, possibly combined with k-anonymity. In an embodiment with k-anonymity, a certain value of k is chosen, where the level of attained anonymity increases for increasing k. Possible values for k are between 2 and 100, endpoints included, although larger values are also possible. In a preferred embodiment, k is between 3 and 50; more preferably between 5 and 25; even more preferably between 7 and 20; most preferably equal to 9, 10 or 11. The threshold-tested transaction data is tested for level of anonymity according to the k-anonymity concept, implying that a value of each entry within at least one field of the tested data occurs at least k times, and wherein a value of k is such that entries of the output data source match a specified anonymity requirement. In an alternative embodiment, an anonymity test not based on k-anonymity such as k-concealment may be used. If the test is positive, and anonymity is found to be sufficient, an iteration is made to step (f), i.e. the categorization. Likewise, if the test is positive, and anonymity is found to be sufficient, an iteration is made to step (vi), i.e. the categorization. If the test is negative and anonymity is found to be insufficient, an iteration is made to step (e) and/or step (v). In step (e) and/or step (v), the level of detail of the anonymity-tested transaction data is reduced. In one embodiment, the reduction of the level of detail may comprise any or any combination of the following: suppressing entry values, replacing entry values, changing the bin size (or, related, the feature granularity) of entry values. After reduction of the level of detail, aggregation-ready transaction data is obtained and fed back to step (b) and/or step (ii). This allows a new cycle of aggregation, threshold-testing and anonymity testing, to be repeated until the specified anonymity requirement is met.

Together, step (a) to (e) realize an advanced method of privacy protection, ensuring that after the aggregation it is no longer possible to identify individual customers by reverse engineering the aggregate statistics. Similarly, step (i) to (v) realize an advanced method of privacy protection, ensuring that after the aggregation it is no longer possible to identify individual customers by reverse engineering the aggregate statistics. These steps prevent the subsequent steps to link back to individuals, so that user privacy is maintained.

In a second aspect, the present invention provides a method for deriving tailored transaction data from raw transaction data, wherein said raw transaction data comprises raw additional data relating to said user and/or the product/service to which said raw transactions relate. This allows to obtain enriched data, leading to enriched tailored transaction data and improved business insights for recipients of the tailored transaction data.

In a further aspect, the present invention includes enhanced tokenizing in step (a), comprising exclusion of privacy sensitive data. Similarly, in a preferred embodiment, the present invention includes enhanced tokenizing in step (i), comprising exclusion of privacy sensitive data. This is beneficial for the anonymity of users.

In a further aspect of the present invention, said raw transactions are tokenized independently of said raw additional data and wherein said raw additional data is tokenized independently of said raw transactions, obtaining tokenized transactions and tokenized additional data, respectively. In a further aspect thereof, said aggregation-ready transaction data is obtained after joining said tokenized transactions with said tokenized additional data, optionally by using said token to link said tokenized transactions to said tokenized additional data. This yields enriched data, which leads to enriched tailored transaction data. In one embodiment of the invention, summary data is for instance acquired at the store level both from the transaction data itself (e.g. mean value spent) or from the joined data sources (e.g. personal data of customers performing transactions there).

In a further aspect of the present invention, said raw transaction data comprises real-time data, i.e. data that is received real-time over a network. This yields tailored transaction data that is more up to date, and therefore of higher potential business value to the recipients of said tailored transaction data or said privacy-filtered response.

In a further aspect of the present invention, said threshold-tested transaction data obtained in step (c) comprises aggregate-linking data. Similarly, in a preferred embodiment, said threshold-tested transaction data obtained in step (iii) comprises aggregate-linking data. Hereby, said aggregate-linking data is optionally obtained by using said token to link a first portion of said aggregated transaction data belonging to a first provisional aggregate to a second portion of said aggregated transaction data belonging to a second provisional aggregate. This provides for further enrichment of the data, leading to better business insight for the recipient of the tailored transaction data.

In a further aspect of the present invention, said rule used in step (f) allows automated categorization. Similarly, in a preferred embodiment, said rule used in step (vi) allows automated categorization. Hereby, said automated categorization comprising the use of any or any combination or any value derived of the following: external data comprising a merchant category code (MCC), said raw transaction data, said tokenized transactions, said tokenized additional data, said aggregate-linking data, said aggregation-ready transaction data, said provisional aggregate, said threshold-tested transaction data, said threshold-tested aggregate, said anonymity-tested transaction data. This yields better tailoring of transaction data and also results in higher autonomy for systems implementing said method. Similarly, this yields improved privacy-filtered responses to queries of system users.

In a further aspect of the present invention, said tailored transaction data comprises a characteristic of said users and/or characteristics of the product/service to which a transaction comprised in said aggregated transaction data relates, said characteristic including a segmentation based on a criterion taking into account any or any combination or any value derived of the following: external data comprising a merchant category code (MCC), said raw transaction data, said tokenized transactions, said tokenized additional data, said aggregate-linking data, said aggregation-ready transaction data, said provisional aggregate, said threshold-tested transaction data, said threshold-tested aggregate, said anonymity-tested transaction data, said categorized transaction data, a timestamp of said raw transactions, a sequence of a first and second transaction of a first user and a second user. This leads to enrichment as well as improved accuracy of the tailored transaction data or the privacy-filtered response.

In a further aspect of the present invention, steps (a) to (g) are executed by a computer, similar to steps (i) to (vii), allowing automation of the method described.

In a further aspect, the present invention provides a computing system according to the present invention comprising a processor, tangible, non-transitory memory and instructions on said memory instructing said processor to execute said method, a display to visualize said tailored transaction data and/or a printer to produce a print-out of said tailored transaction data and/or a storage medium to store an electronic data file comprising said tailored transaction data, whereby said computing system is configured to execute said method.

In a further aspect, the present invention provides a tailored transaction data product produced by a computing system as explained above, said tailored transaction data product comprising any or any combination of the following: said print-out of said tailored transaction data, said electronic data file comprising said tailored transaction data.

In a further aspect, the present invention provides a computer program product to execute the methods explained above, whereby said computer program product comprises at least one computer-readable medium comprising computer-readable program portions, whereby said program portions contain instructions for execution of said method.

According to the aspect of deriving tailored transaction data from raw transaction data, the present invention relates to following points 1 to 13.

1. Method for deriving tailored transaction data from raw transaction data, wherein said raw transaction data comprises a plurality of raw transactions associated with a plurality of users and is organized in fields and entries, said method comprising the steps of
   (a) tokenizing said raw transaction data with a token, obtaining aggregation-ready transaction data;
   (b) aggregating said aggregation-ready transaction data, obtaining aggregated transaction data, whereby each portion of said aggregated transaction data belongs to at least one provisional aggregate;
   (c) performing a threshold test for each of said provisional aggregates and discarding a portion of the aggregated transaction data belonging to aggregates for which the number of unique users is below said threshold, obtaining threshold-tested transaction data, whereby each portion of said threshold-tested transaction data belongs to at least one threshold-tested aggregate;
   (d) performing an anonymity test for each of said threshold-tested aggregates and obtaining anonymity-tested transaction data, moving to step (e) if negative and jumping to step (f) in the opposite case;
   (e) reducing the level of detail of said anonymity-tested transaction data and obtaining aggregation-ready transaction data, jumping to step (b);
   (f) categorizing said anonymity-tested transaction data using a rule, obtaining categorized transaction data;
   (g) deriving said tailored transaction data from said categorized transaction data.
2. Method for deriving tailored transaction data from raw transaction data according to point 1, wherein said raw transaction data comprises raw additional data relating to said user and/or the product/service to which said raw transactions relate.
3. Method according to point 1 or point 2, wherein said tokenizing in step (a) comprises exclusion of privacy sensitive data.
4. Method according to point 2-3, wherein said raw transactions are tokenized independently of said raw additional data and wherein said raw additional data is tokenized independently of said raw transactions, obtaining tokenized transactions and tokenized additional data, respectively;
5. Method according to point 4, wherein said aggregation-ready transaction data is obtained after joining said tokenized transactions with said tokenized additional data, optionally by using said token to link said tokenized transactions to said tokenized additional data.
6. Method according to point 1-5, wherein said raw transaction data comprises real-time data, i.e. data that is received real-time over a network.
7. Method according to point 1-6, wherein said threshold-tested transaction data obtained in step (c) comprises aggregate-linking data, whereby said aggregate-linking data is optionally obtained by using said token to link a first portion of said aggregated transaction data belonging to a first provisional aggregate to a second portion of said aggregated transaction data belonging to a second provisional aggregate.
8. Method according to point 1-7, wherein said rule used in step (f) allows automated categorization, said automated categorization comprising the use of any or any combination or any value derived of the following: external data comprising a merchant category code (MCC), said raw transaction data, said tokenized transactions, said tokenized additional data, said aggregate-linking data, said aggregation-ready transaction data, said provisional aggregate, said threshold-tested transaction data, said threshold-tested aggregate, said anonymity-tested transaction data.
9. Method according to point 1-8, wherein said tailored transaction data comprises a characteristic of said users and/or characteristics of the product/service to which a transaction comprised in said aggregated transaction data relates, said characteristic including a segmentation based on a criterion taking into account any or any combination or any value derived of the following: external data comprising a merchant category code (MCC), said raw transaction data, said tokenized transactions, said tokenized additional data, said aggregate-linking data, said aggregation-ready transaction data, said provisional aggregate, said threshold-tested transaction data, said threshold-tested aggregate, said anonymity-tested transaction data, said categorized transaction data, a timestamp of said raw transactions, a sequence of a first and second transaction of a first user and a second user.
10. Method according to any of the previous points, whereby steps (a) to (g) are executed by a computer.
11. Computing system in accordance with a method according to any of the previous points comprising a processor, tangible, non-transitory memory and instructions on said memory instructing said processor to execute said method, a display to visualize said tailored transaction data and/or a printer to produce a print-out of said tailored transaction data and/or a storage medium to store an electronic data file comprising said tailored transaction data, whereby said computing system is configured to execute said method.
12. A tailored transaction data product produced by a computing system according to point 11, said tailored transaction data product comprising any or any combination of the following: said print-out of said tailored transaction data, said electronic data file comprising said tailored transaction data.
13. A computer program product to execute a method according to point 10, whereby said computer program product comprises at least one computer-readable medium comprising computer-readable program portions, whereby said program portions contain instructions for execution of said method.

The invention is further described by the following non-limiting examples which further illustrate the invention, and are not intended to, nor should they be interpreted to, limit the scope of the invention.

EXAMPLES

FIG. 1 illustrates a first embodiment relating to the present invention, in a case where the transactions concern financial transactions. It displays three main aspects summarizing the key aspects of the methods disclosed in this document. A first aspect, "User privacy protection", relates to privacy filtering according to the present invention, such as said filtering in step (C.2) and/or step (i) to (vii) and/or step (a) to (e) according to the present invention. A second aspect, "Categorization of transactions", relates to step (vi) and/or step (f) according to the present invention. A third aspect, "Generating business insights", corresponds to the generation of tailored transaction data, and relates to step (vii) and/or step (g) of a method according to the present invention.

Figure 2:
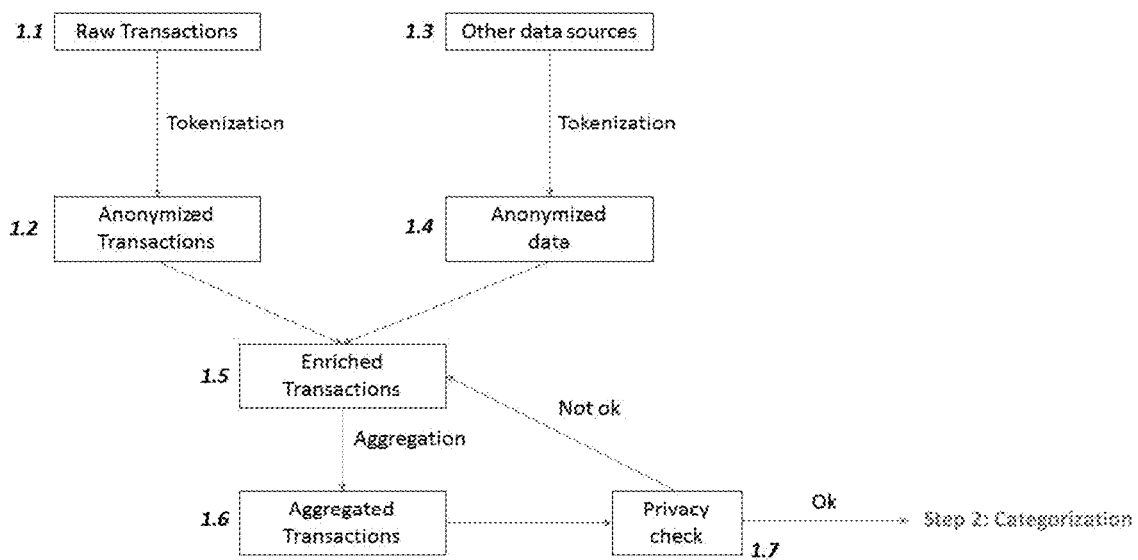
FIG. 2 shows a second embodiment relating to aspects of the present invention.

FIG. 2 shows a second embodiment relating to aspects of the present invention. Specifically, said second embodiment relates to a "User privacy protection" aspect of the methods disclosed in this document. In this embodiment, the starting point is a plurality of raw financial transactions (1.1). This data is tokenized as to exclude all data that could identify an individual entity (1.2, e.g. a bank account number is tokenized). Next, alternative data sources (1.3 such as client characteristics and product ownerships) are tokenized as well (1.4, e.g. tokenizing bank account number and client number, but also excluding features such as name and address, e.g. street+house number). Subsequently, the alternative data sources are joined to the transactions data to enrich it (1.5). The tokenization entails the first layer of the user privacy protection. The second layer of privacy protection is aggregating the transactions to make an abstraction of individual information. The enriched transaction data is aggregated to a point-of-interest level (1.6, e.g. a store, a chain of stores, a group or a sector—in the rest of the description, the example of store will be used to refer to a point of interest). Only when transactions of more than N unique clients (a predefined threshold) are observed in this store, aggregate statistics are calculated for the store, otherwise the transactions are discarded. A third and final layer of privacy protection validates on our customer base that after the aggregation it is no longer possible to identify individual customers by reverse engineering the aggregate statistics (e.g. by using k-anonymity as anonymity concept, or any other or any combination of anonymity concepts mentioned in this document), otherwise the number of aggregate statistics shown is reduced (1.7). Through this aggregation, summary data is acquired at the store level originating from the transaction data itself (e.g. mean value spent) and/or from the joined data sources (e.g. personal data of customers performing transactions there).

Figure 3:
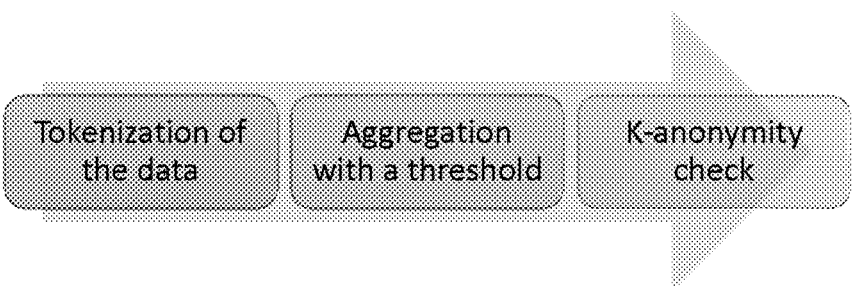
FIG. 3 shows a third embodiment relating to aspects of the present invention.

FIG. 3 shows a third embodiment relating to aspects of the present invention. In this embodiment, three layers occur which correspond to the three layers mentioned for the second embodiment. The main difference with the second embodiment is that in the third embodiment, while the anonymity concept may be any or any combination of the concepts mentioned in this document, the preferred anonymity concept is k-anonymity. For the second embodiment, no preference is given for the anonymity concept.

Figure 4:
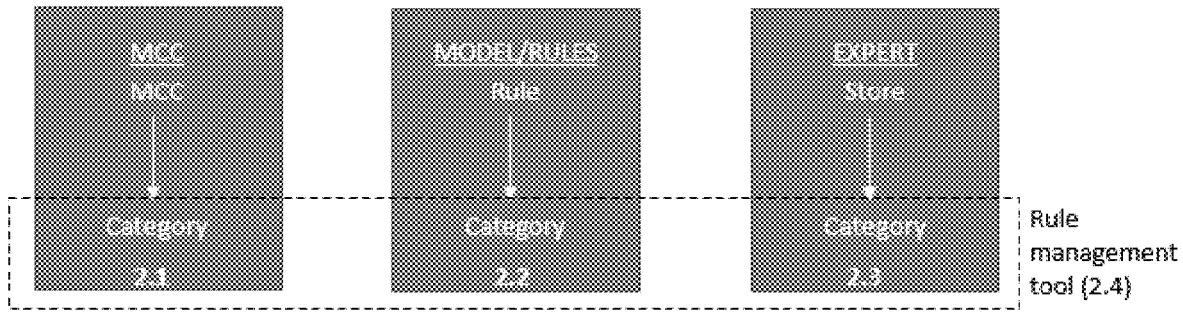
FIG. 4 shows a fourth embodiment relating to aspects of the present invention.

FIG. 4 shows a fourth embodiment relating to aspects of the present invention, relating to a "Categorization of transactions" aspect of the methods disclosed in this document. Specifically, FIG. 4 shows a flow of categorization for the fourth embodiment, comprising a specific type of categorization referred to as tagging. In one further embodiment, tags concern specific details about entities whereas categories that are not tags serve to assign a broad grouping of entities. The fourth embodiment concerns a specific example with stores as point-of-interests. To be able to aggregate to a higher level than a store, the stores are categorized into meaningful groups (mainly based on business purpose of the store but also on other dimensions such as level of luxury or geo-location). Instead of categorizing the stores themselves, we build a sustainable system capable of categorizing also new stores not previously identified in the transaction data. General categorization rules are created and stored in a database, which can be queried to automatically label new transactions. Point-of-sale terminals used by the stores usually have a merchant category code (MCC) assigned, which is provided by the payment system provider (2.1). The MCC categorization structure is usually not ideal for business insight purposes and the assigned MCC can be often wrong. Hence, the MCC structure can be directly mapped to any other, more relevant categorization structure and we perform a correction for the individual MCC assignments. For example, if 90% of stores whose name contains "PIZZERIA" are classified as "RESTAURANT", then we assume that the other 10% are misclassified and we reassign them to the "RESTAURANT" category as well. Moreover, we create a rule "if a store name contains 'PIZZERIA' then assign category 'RESTAURANT'" and store it for future usage (2.2). To improve accuracy, these rules can be further validated, altered and maintained by domain experts (2.3). The above-mentioned rules are stored and managed in a rule management tool (2.4). Similarly to assigning categories, the system also allows for tagging transactions across categories. The above-described method can be also used to incorporate external data sources that map store names to categories (e.g. Gouden Gids, Resto.be). When a sufficient number of stores is categorized, a machine learning model can be used that predicts categories based on store characteristics (described as summary data in the 2nd paragraph) and external data.

Figure 5:
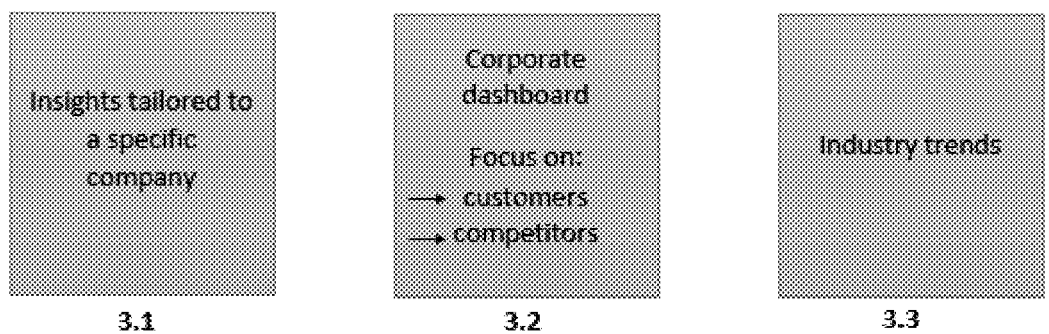
FIG. 5 shows a fifth embodiment relating to aspects of the present invention.

FIG. 5 shows a fifth embodiment relating to aspects of the present invention, relating to a "Generating business insights" aspect of the methods disclosed in this document. The store characteristics based on anonymized person data can provide valuable business insights to stores themselves or can be aggregated to a higher level based on the categorization structure. At the level of the store or company, we can provide basic characteristics of its customers and segment them based on desired criteria (e.g. profile the customers who shop in the morning or those with high income). Other examples of possible desired criteria to segment customers are: balance available, living standards measure (LSM), marital status, age, typical day of the week for transactions, typical hour of the day for transactions, typical product group for products purchased. It is also possible to identify where the customers usually shop before and after the visit of the store. These insights can be provided by performing a tailor-made analysis (3.1) or industrialized by creating a dashboard tool (3.2). Furthermore, abstraction can be made on an industry level and trends can thus be extracted (3.3).

Figure 6:
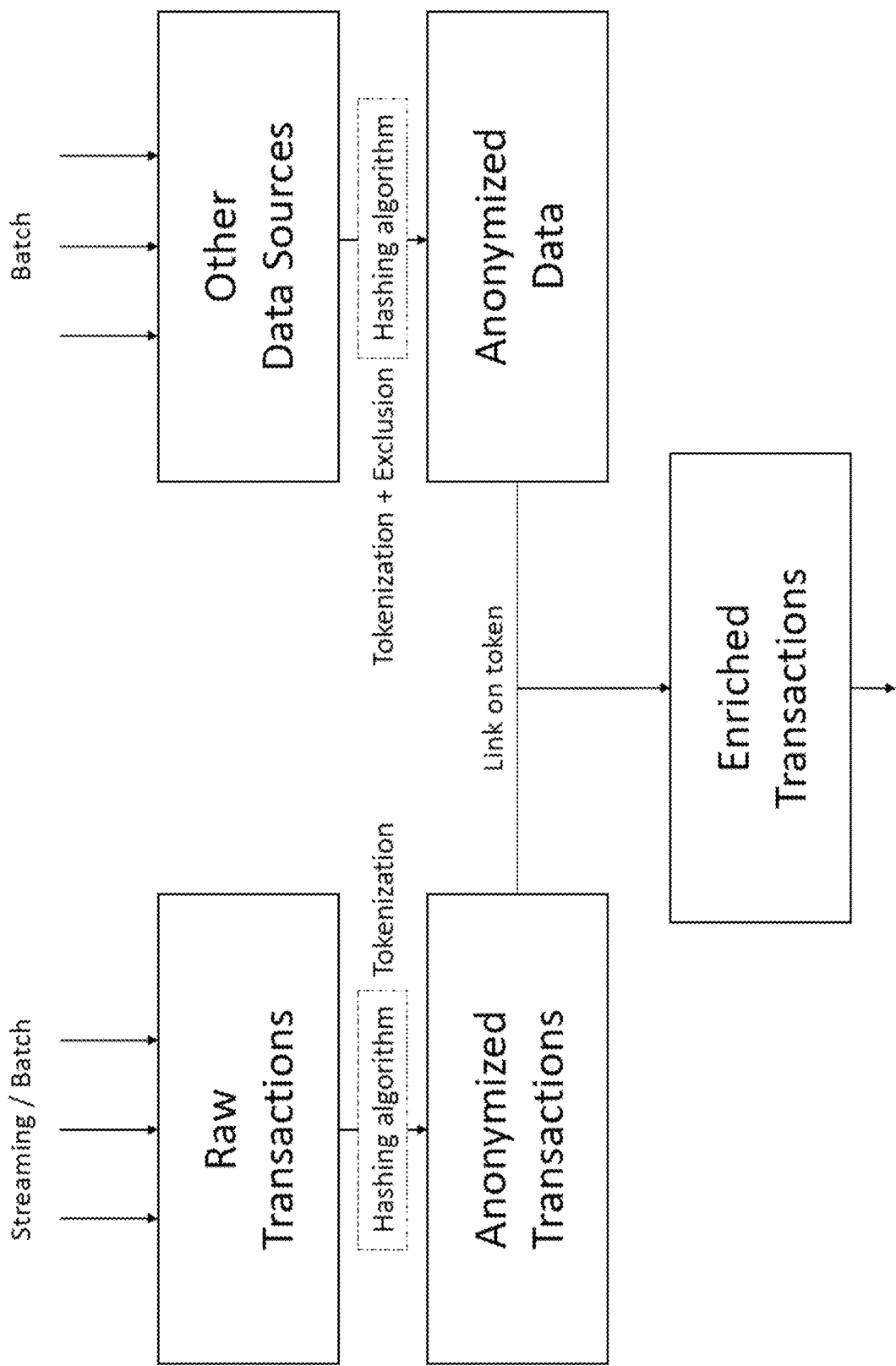
FIG. 6 shows a sixth embodiment relating to aspects of the present invention.

FIG. 6 shows a sixth embodiment relating to aspects of the present invention, relating to a "User privacy protection" aspect of the methods disclosed in this document. In said sixth embodiment, raw transactions enter the system in streaming or batch mode. The other data sources enter the system in batch, as they tend to be of a static nature (e.g., demographics). A hashing algorithm (or any related tokenization algorithm) creates a token based on a primary key that can link multiple data sources (such as bank account number). The other data sources include an exclusion step as well, to remove privacy-sensitive features such as first- and last names.

FIG. 7 shows a seventh embodiment relating to aspects of the present invention, relating to a "User privacy protection" aspect of the methods disclosed in this document. Specifically, FIG. 7 illustrates an embodiment of the tokenization operation as carried out on example data. As illustrated in FIG. 7, account numbers present in the raw transaction data can be obfuscated by applying a form of tokenization whereby said account numbers are hashed, in this case yielding unique alphanumeric strings that are in a bijective relation with the original raw account numbers.

FIG. 8 shows an eighth embodiment relating to aspects of the present invention, relating to a "User privacy protection" aspect of the methods disclosed in this document. Specifically, FIG. 8 illustrates another embodiment of the tokenization operation as carried out on example data. As illustrated in FIG. 8, tokenization may comprise both the hashing of account numbers and the exclusion of certain privacy-sensitive features. In this example, the features "Firstname", "Lastname" and "Address" are excluded.

Figure 9:
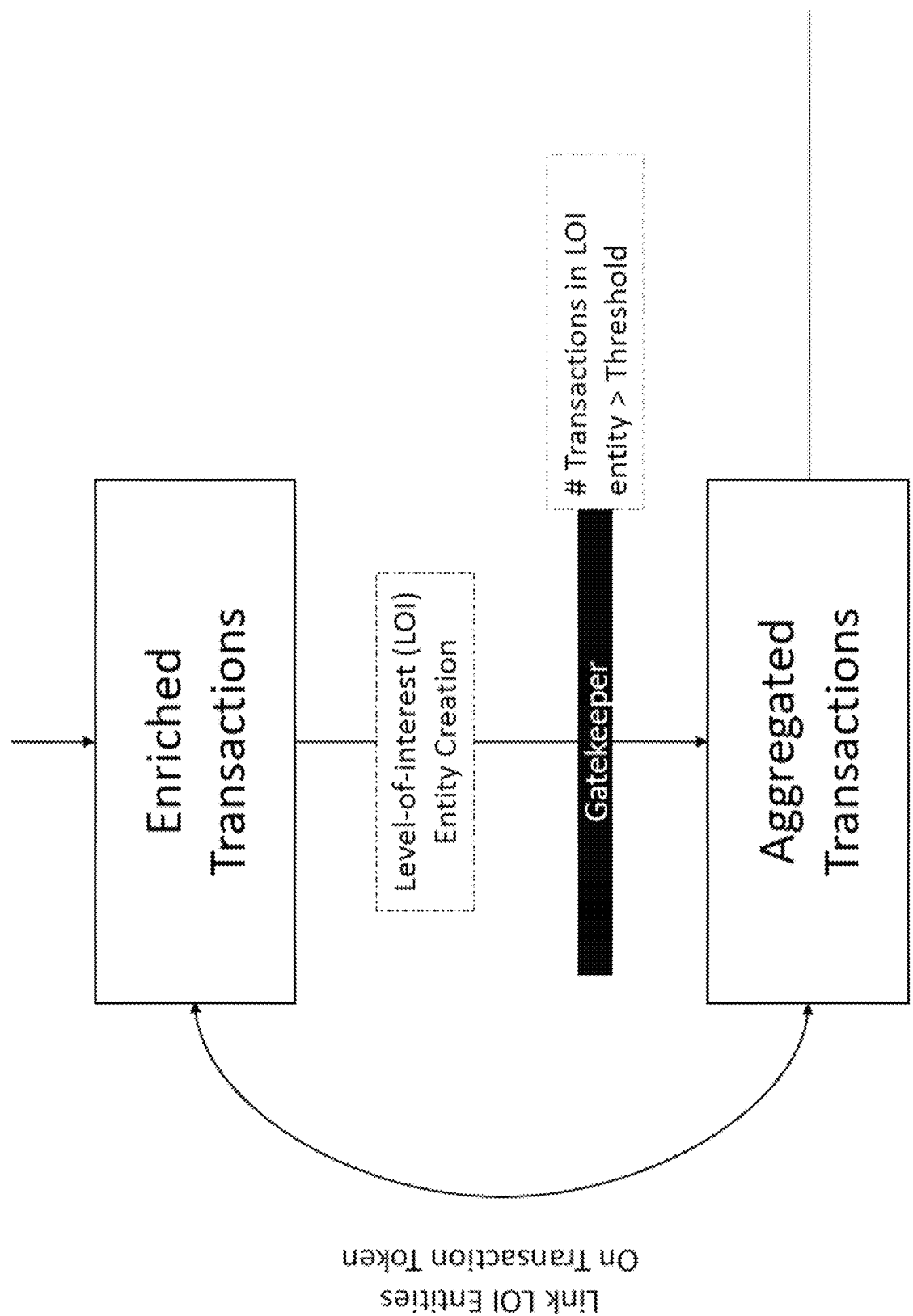
FIG. 9 shows a first view of a ninth embodiment relating to aspects of the present invention.

FIG. 9 shows a first view of a ninth embodiment relating to aspects of the present invention, relating to a "User privacy protection" aspect of the methods disclosed in this document. To be able to aggregate enriched transactions, a level-of-interest (LOI) needs to be defined (e.g., store as a level of interest). Next, the specific LOI entity is added to the data (e.g., a store identifier is added to each enriched transaction). A gatekeeper groups transactions on LOI and lets them through for further analyses as soon as the number of transactions exceed a predefined threshold. Summary statistics are calculated on the LOI (e.g., average amount spent, proportion of males). Tokens can be used to track purchase links between different LOI entities (e.g., on average, if a client goes to store A, to which other stores does this client go as well).

Figure 10:
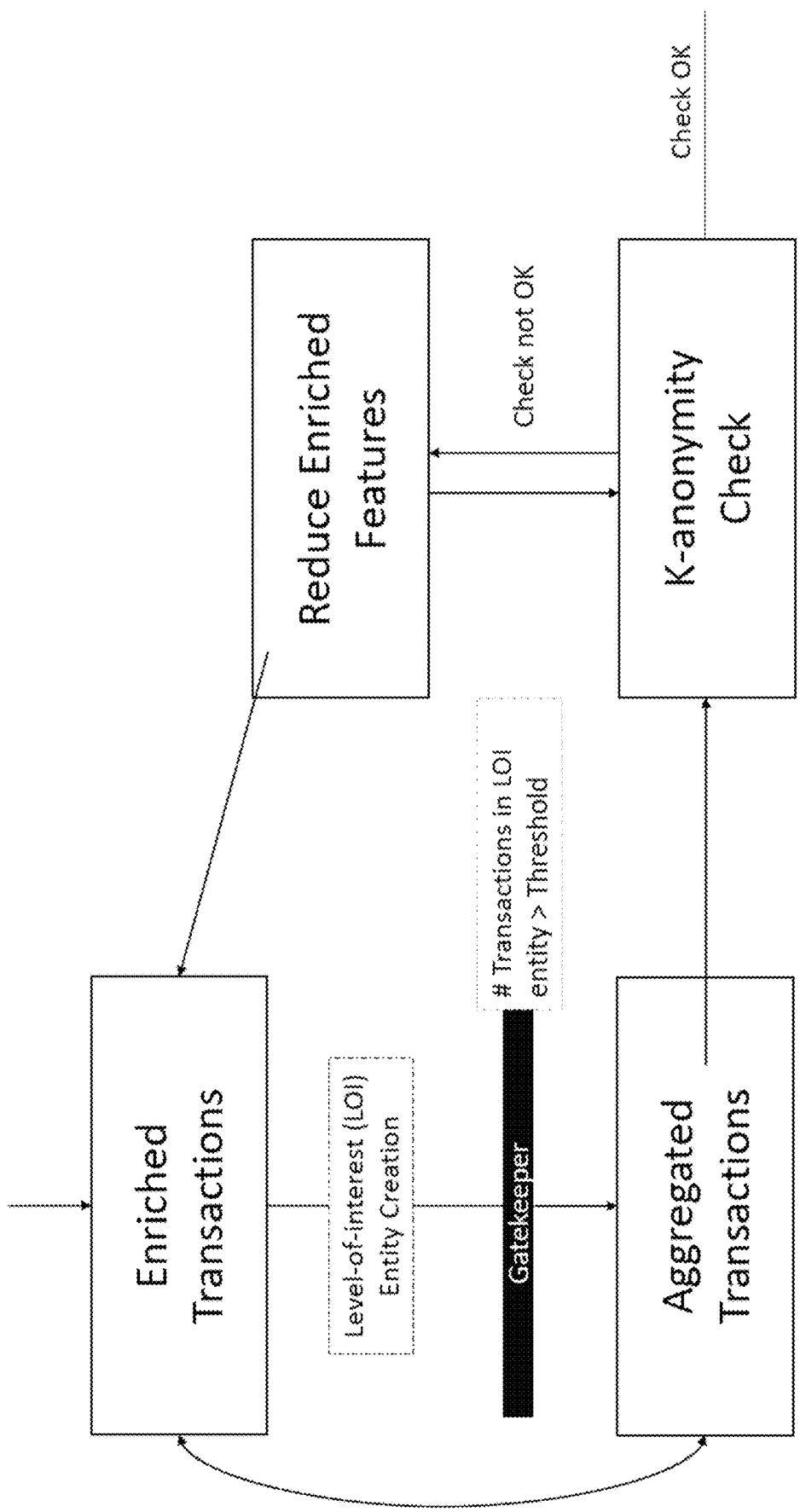
FIG. 10 shows a second view of a ninth embodiment relating to aspects of the present invention.

FIG. 10 shows a second view of said ninth embodiment relating to aspects of the present invention, relating to a "User privacy protection" aspect of the methods disclosed in this document. A k-anonymity check is performed. If an aggregated transaction passes the check, it transgresses to the categorization part of the system. If it does not pass the check, two options can be used. Features can be dropped, after which the k-anonymity check is performed again. Or the feature granularity, comprising also the bin size, is altered. This takes place in the original enriched transactions, meaning the transactions need to be re-aggregated. In an alternative embodiment, k-anonymity is combined with or replaced by t-closeness to realize a similar aim.

Figure 11:
FIG. 11 shows a tenth embodiment relating to aspects of the present invention.

FIG. 11 shows a tenth embodiment relating to aspects of the present invention, relating to a "User privacy protection" aspect of the methods disclosed in this document. Specifically, the tenth embodiment relates to the reduction of the level of detail of transaction data. In general, the reduction of the level of detail may comprise any or any combination of the following: suppressing entry values, replacing entry values, changing the bin size (or, related, the feature granularity) of entry values. After reduction of the level of detail, aggregation-ready transaction data and is subject to anonymity testing one or more times, reducing the level of detail until a specified anonymity requirement is finally met. In the tenth embodiment, the bin size of the age is altered, moving from single unit granularity to multiples of twenty. Due to this reduction of the level of detail, in terms of age, there is no identifiable difference anymore between the record associated with token "5BAD9EM" and the record associated with token "AAO9MNJ".

Figure 12:
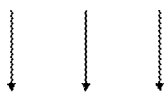
FIG. 12 shows an eleventh embodiment relating to aspects of the present invention.

FIG. 12 shows an eleventh embodiment relating to aspects of the present invention, relating to a "User privacy protection" aspect of the methods disclosed in this document. Specifically, the eleventh embodiment relates to the reduction of the level of detail of transaction data in a way complementary to the tenth embodiment. In the eleventh embodiment, two features are dropped to reduce the level of detail: "Prop. Males", short for "Proportion of Males", and "Prop. Single", short for "Proportion of Singles".

Figure 13:
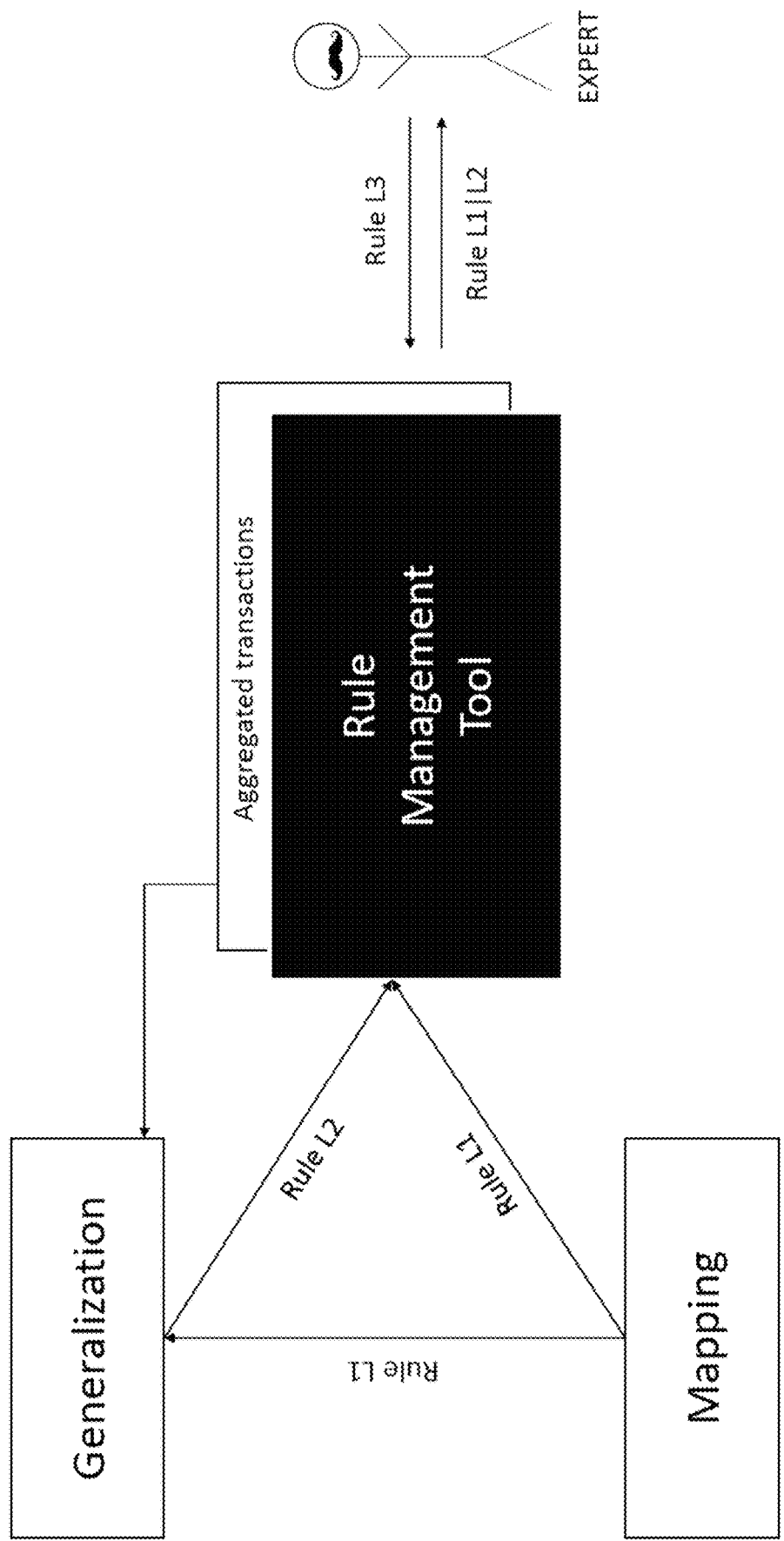
FIG. 13 shows a twelfth embodiment relating to aspects of the present invention.

FIG. 13 shows a twelfth embodiment relating to aspects of the present invention, relating to a "Categorization" aspect of the methods disclosed in this document. A rule management tool is on top of the aggregated transactions. The categories attached to the transactions in this tool can originate from three sources: (1) A mapping from MCC/Golden Pages/Activity Codes/ . . . to the set of predefined categories, (2) A generalization step to uses both the aggregated transactions and the mapping in (1) (e.g., " . . . PIZZA . . . " is category Restaurant), and (3) A step in which experts can interact with the rule management tool to add, alter and maintain rules (originating from (1) and (2)). Hereby, there is an authority level between the rules: L1<L2<L3. Rule L1 is applied only if there is no rule L2 or L3 and rule L2 is applied only if there is no rule L3.

Figure 14:
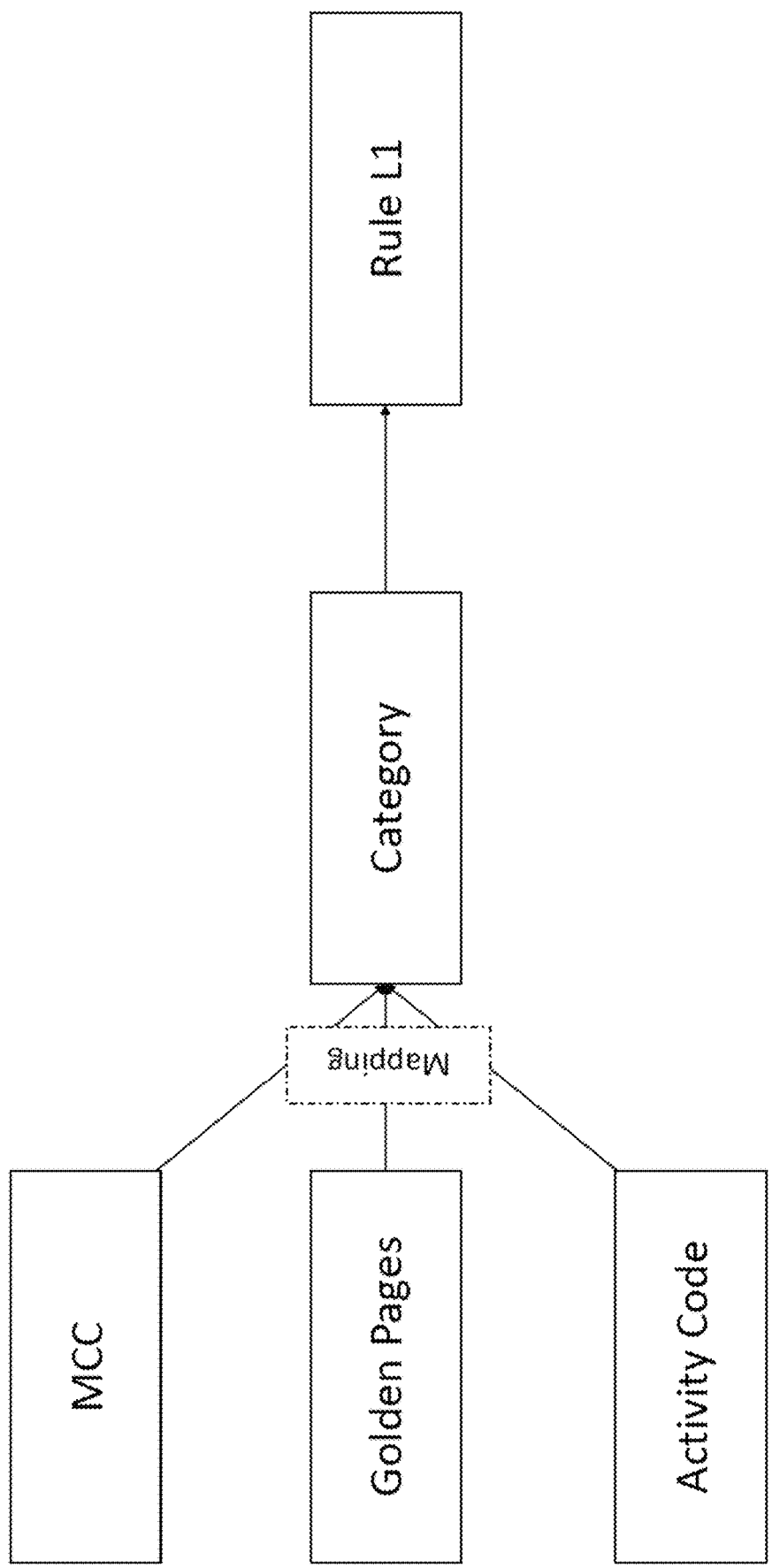
FIG. 14 shows a thirteenth embodiment relating to aspects of the present invention.

FIG. 14 shows a thirteenth embodiment relating to aspects of the present invention, relating to a "Categorization" aspect of the methods disclosed in this document, specifically the definition of a rule. Different data sources can be mapped to a predefined set of categories, which in turn defines a rule.

Figure 15:
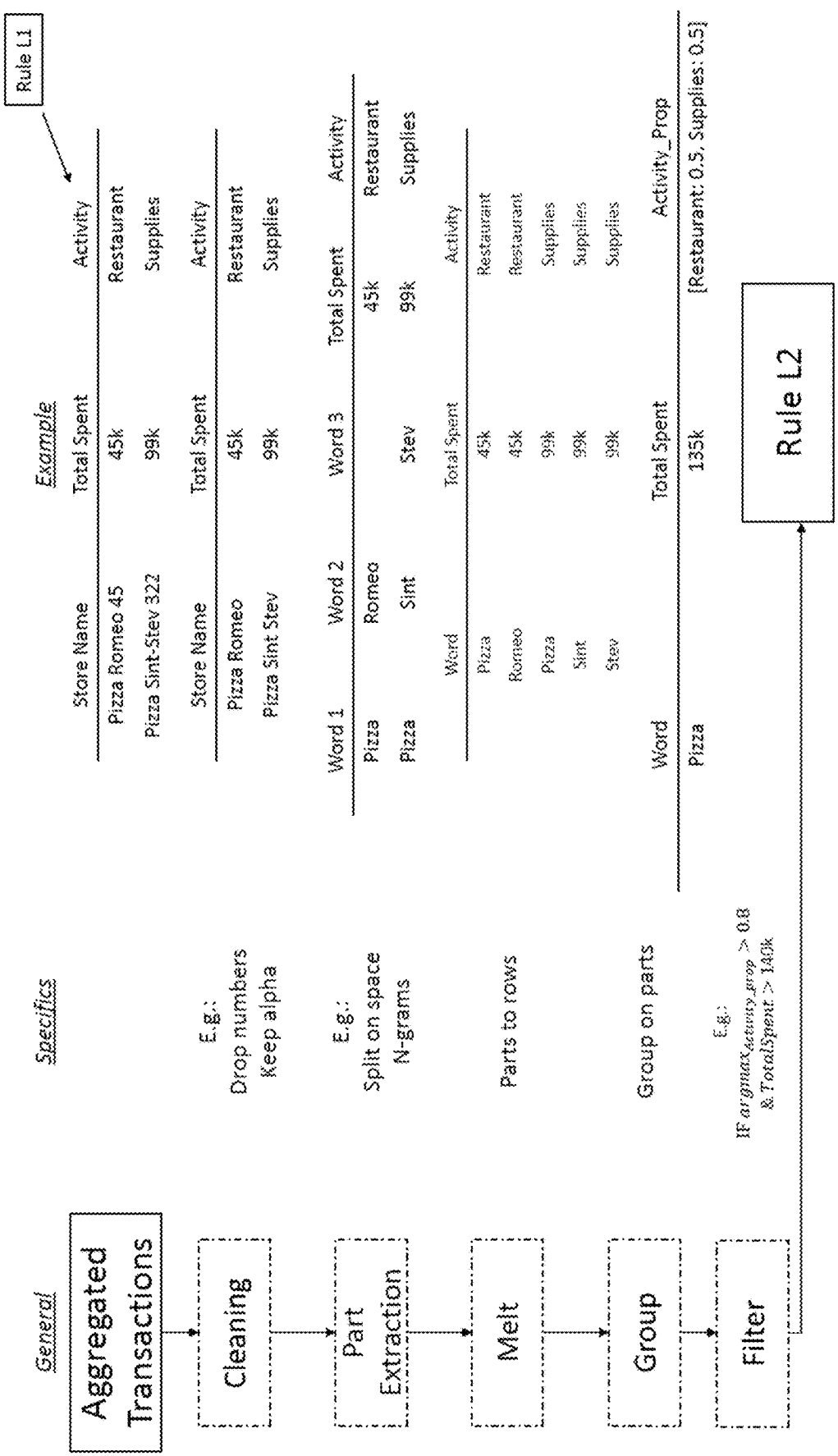
FIG. 15 shows a fourteenth embodiment relating to aspects of the present invention.

FIG. 15 shows a fourteenth embodiment relating to aspects of the present invention, relating to a "Categorization" aspect of the methods disclosed in this document. The aggregated transactions that have an L1 rule can be used to create an L2 rule. First, the transaction is cleaned. This means that the LOI entity (store name in the example) is cleaned and for example al non alpha characters are dropped. Next, parts are extracted from the name. Typically, the store name is split in separate words. Third, the parts are converted into words. Subsequently, identical words are grouped together and a feature is calculated that indicates the proportion of categories. Finally, a filter is applied that defines a rule. For example, the proportion of the most frequent category should be more than 0.8 and the total spent should be larger than 140 k. Furthermore, additional filters can be added to make sure the second most frequent category is below a predefined threshold.

Figure 16:
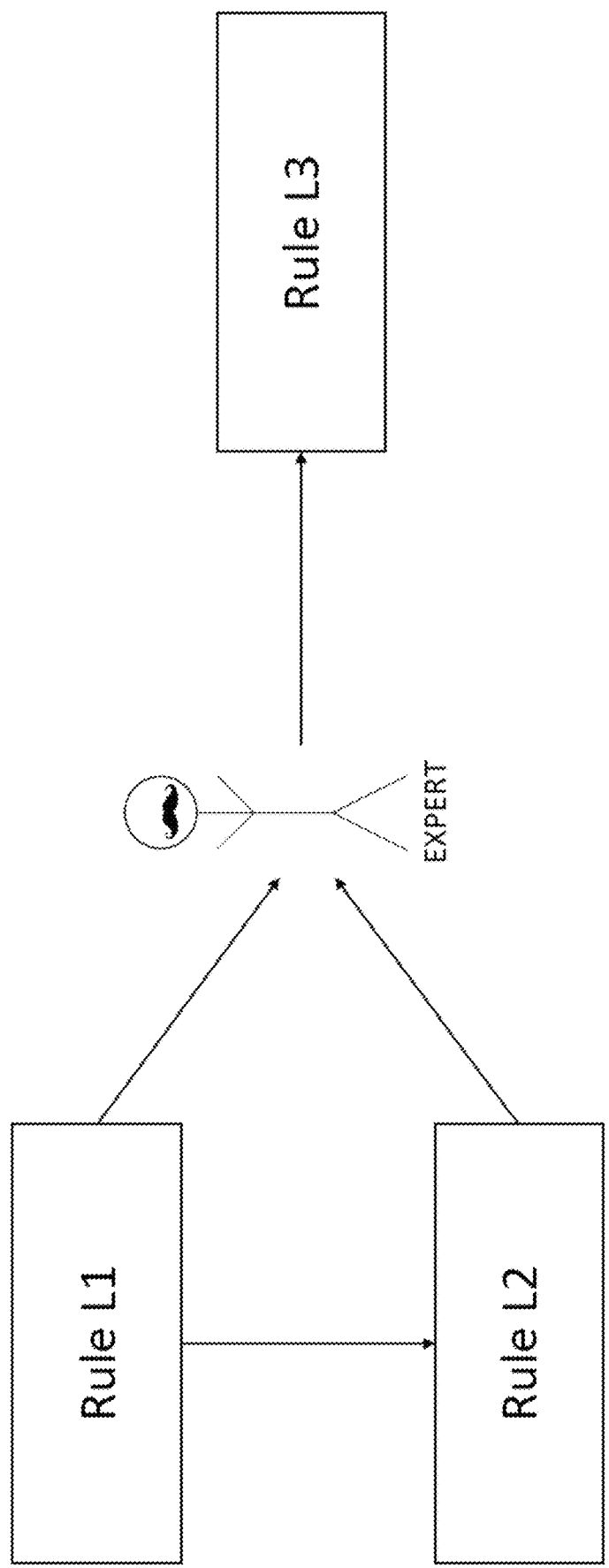
FIG. 16 shows a fifteenth embodiment relating to aspects of the present invention.

FIG. 16 shows a fifteenth embodiment relating to aspects of the present invention, relating to a "Categorization" aspect of the methods disclosed in this document, specifically the relation between rules. Also here, there is an authority level between the rules: L1<L2<L3. Rule L1 is applied only if there is no rule L2 or L3 and rule L2 is applied only if there is no rule L3. Rule L1 and L2 can be adjusted by an expert who controls rule L3. Furthermore, even completely new rules can be created for uncategorized transactions.

Figure 17:
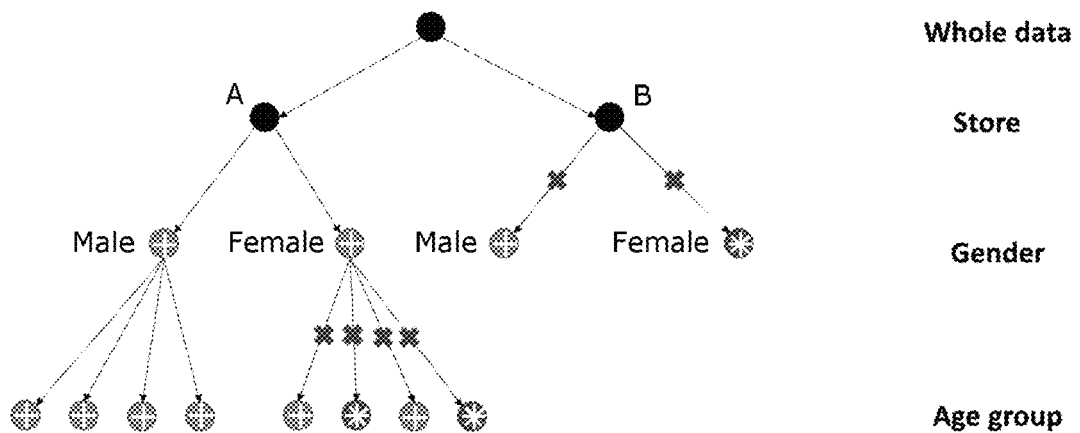
FIG. 17 shows sixteenth embodiment relating to aspects of the present invention.

FIG. 17 shows sixteenth embodiment relating to aspects of the present invention. Two stores, A and B and a group of users is considered. For each of the users the gender is known to the system, as well as information regarding their age group. Consider that one first launches a query to receive the mean income of clients in store B. Next, one may launch a query to see this income split according to gender. If store B is targeted mainly at males, a sufficiently large number of users may belong to this category. This is indicated with a "+" symbol in FIG. 17. However, it might be that the group of store B—females is smaller than k. This is indicated with a symbol "*" in FIG. 17. Hence, its result is omitted. Yet, by comparing the mean of store B with the mean of the males in store B, one can draw conclusions with a certain probability on the mean income of female clients in store B. This is an issue which is traditionally resolved using differentially private mechanisms. These mechanisms involve adding random noise to the data to prevent probabilistic conclusions. For store B, gender cannot be added to the query as the subgroup of females is too small. For store A, age group can be added for males, but not for females. This of course implies an ordering between features, which can be based on arbitrary rules or analyses on the data. Therefore, as mentioned above, in a preferred embodiment of the system, microaggregation and/or aggregation is performed with a k-anonymity check across subgroups of the same branch to prevent probabilistic conclusions, optionally in combination with t-closeness.

Figure 18:
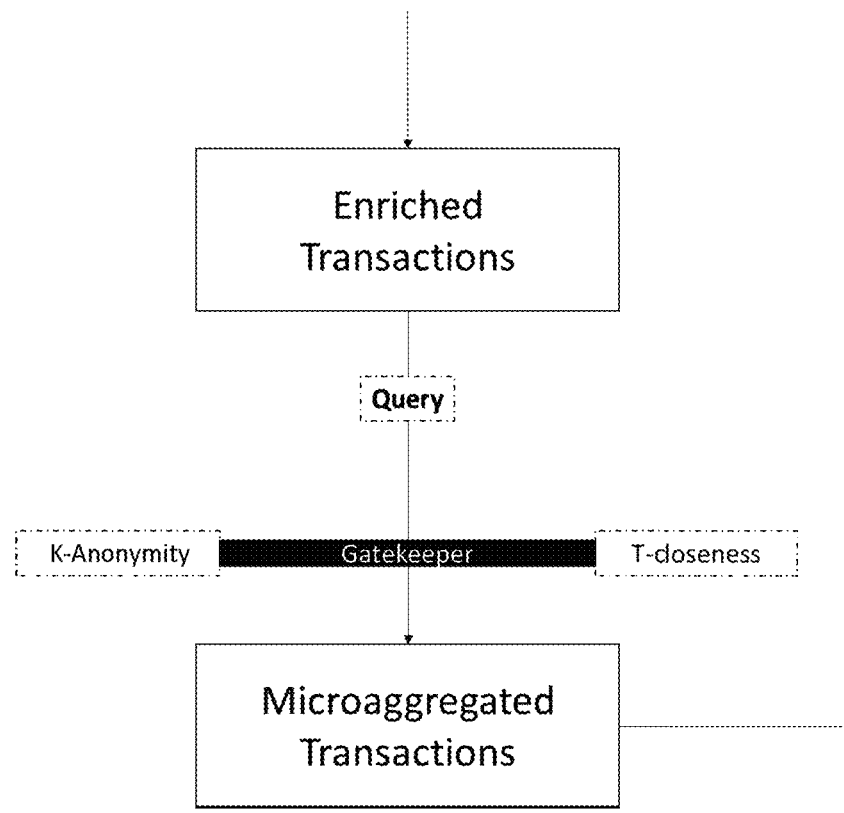
FIG. 18 shows a seventeenth embodiment relating to aspects of the present invention.

FIG. 18 shows a seventeenth embodiment relating to aspects of the present invention. It illustrates an embodiment with a particular way in which privacy protection is embedded in the system. The gatekeeper, also referred to as privacy filter or privacy mechanism in this document, prevents the "publication" of privacy sensitive data. The combination of k-anonymity and t-closeness makes sure that the privacy of individual users is maintained, while still yielding sufficiently detailed output in the privacy-filtered response, allowing for business insights.

Figure 19:
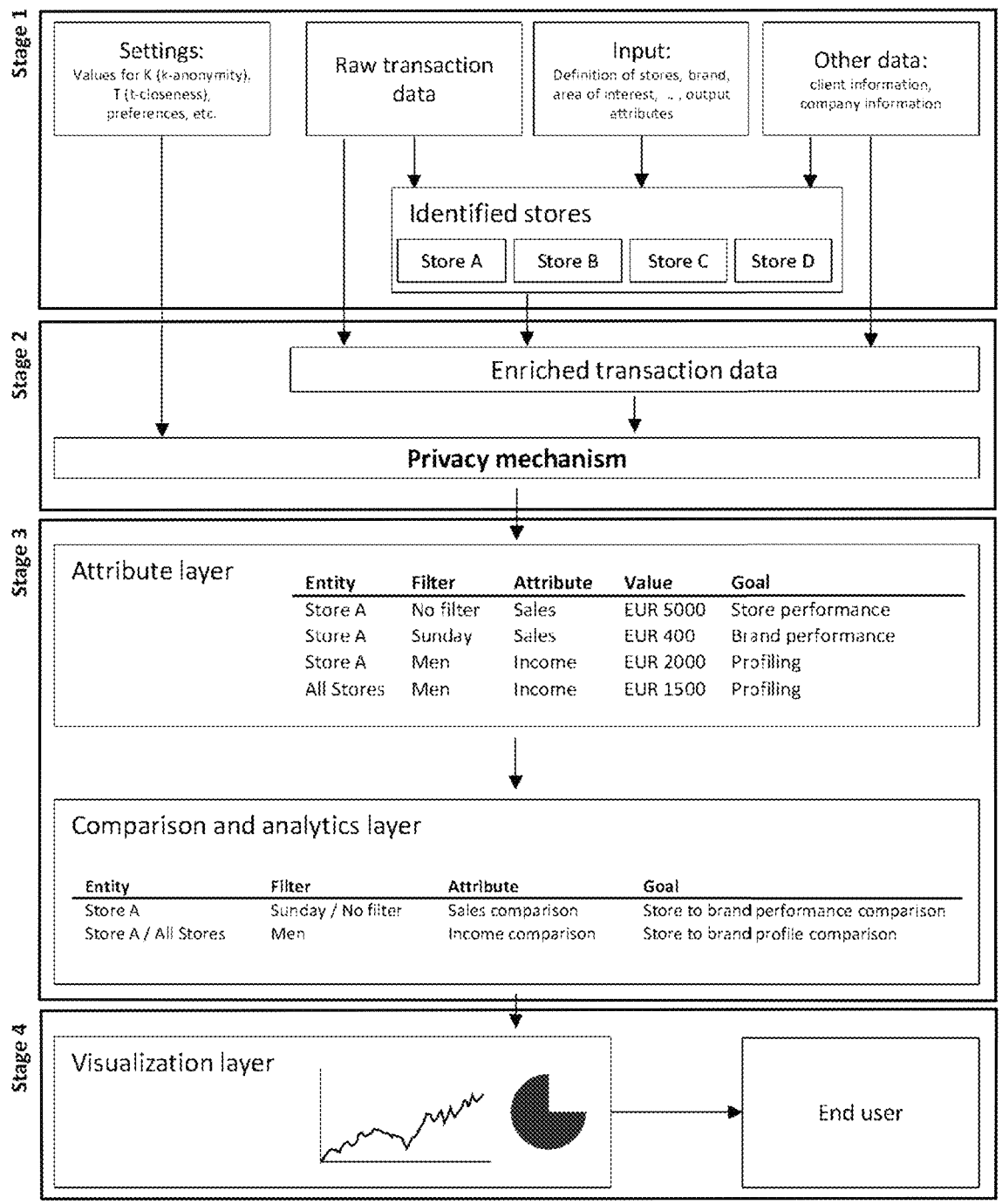
FIG. 19 shows an eighteenth embodiment relating to aspects of the present invention.

FIG. 19 shows an eighteenth embodiment relating to aspects of the present invention. It concerns an example of a detailed schema of said customer profiling module. The schema can be described according to following stages 1 to 4.

Stage 1. The main inputs to the system are
  the general settings, such as the privacy parameters that can differ according to legislations in different countries. These include e.g. the parameter k for k-anonymity, the parameter t for t-closeness
  raw logs of parsed transactions data
  system user input, such as how the points of interest are defined in the transactions, which types of customers and output attributes he/she is interested in customer data to enrich the transactions, e.g. the demographic and financial data of the customers making the transactions, their profiles, habits or other transactions Using the system user input parameters, the system identifies the points of interest directly given their ids (e.g. given the combination of id and name of the terminal)

Stage 2. The transaction data is subsequently enriched by joining with the other data. Subsequently, the privacy mechanism is applied. The privacy mechanism takes into account the settings parameters and the only the attributes and filters that comply with it are allowed to pass through. Some of the attributes/filters might need to be more generalized to be allowed to pass. Hereby, a filter refers to a desired attribute or field that is specified by the system user, and may or may not appear as such in the raw transaction data or the other data. This type of "filtering" is to be distinguished from the concept of "privacy filtering" as described in this document. Examples of such a filter are a gender, e.g. "Male", or a day of the week, e.g. "Sunday", as shown in FIG. 19.

Stage 3. The attributes that passed the privacy mechanism land in the attribute layer. This is a stage where all attributes are stored that give information about e.g. sales in individual stores of the brand of the system user, profiles of customers in these shops in different age groups or at different times of the day. The attributes can be prepared on different levels of detail, e.g. one store, one region or all the stores of interest. In a preferred embodiment, the comparison layer can create new metrics from combinations of attributes, e.g. performance of a shop versus all shops in the brand, average age of all men versus all women. Preferably, it can also forecast sales in the next period or watch trends by comparing sales in different points in history.

Stage 4. Finally, the visualization layer prepares the insights to be consumed by the system user in forms of charts, tables and written insights. In a preferred embodiment, the insights are served via an interactive computer application and/or via a generated report and/or via consultation with a bank expert.

Figure 20:
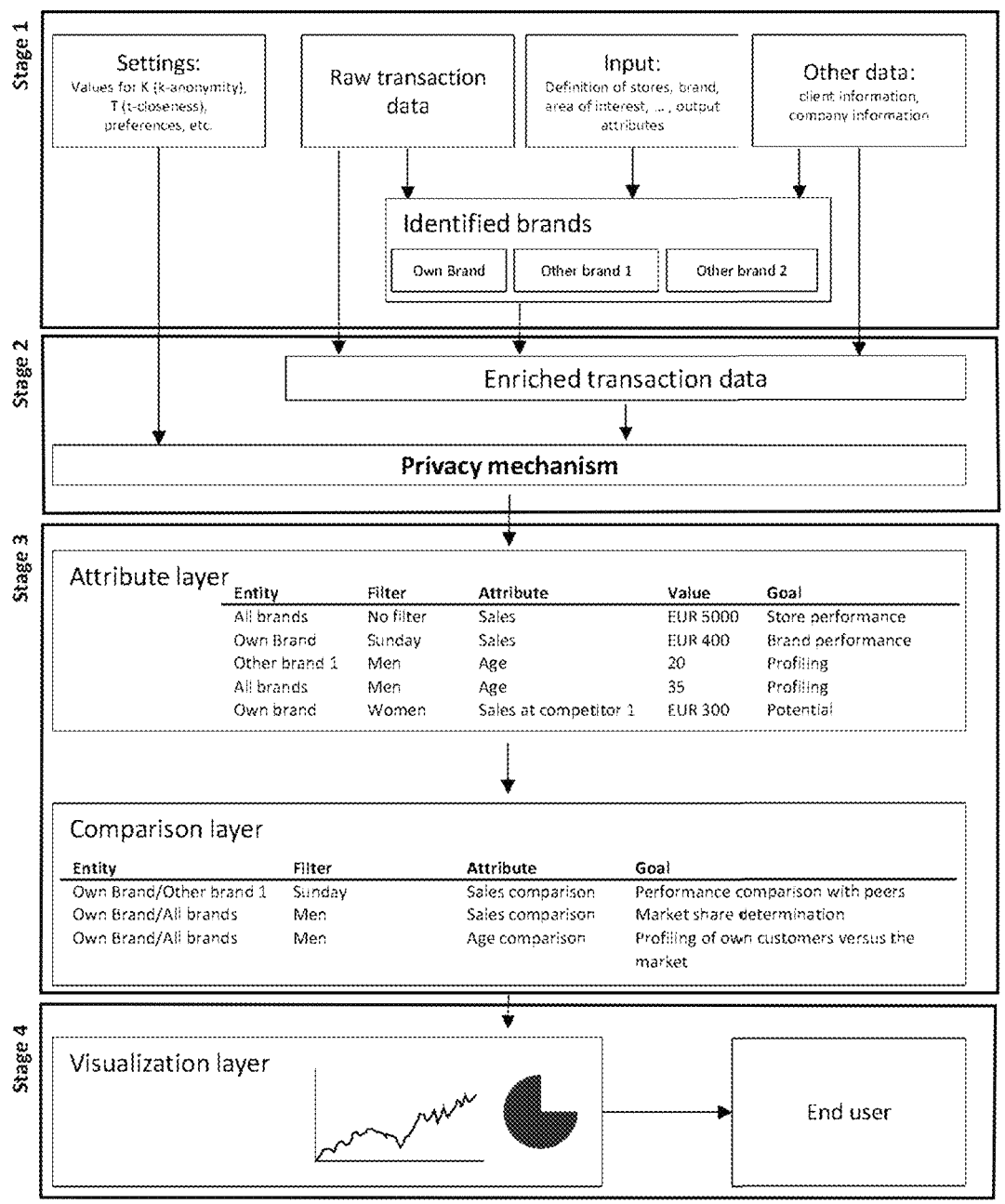
FIG. 20 shows a nineteenth embodiment relating to aspects of the present invention.

FIG. 20 shows a nineteenth embodiment relating to aspects of the present invention. It concerns an example of a detailed schema of said market insights module. The schema can be described according to following stages 1 to 4.

Stage 1. The main inputs to the system are the general settings, such as the privacy parameters that can differ according to legislations in different countries. These include e.g. the parameter k for k-anonymity, the parameter t for t-closeness raw logs of parsed transactions data system user input, such as how the points of interest are defined in the transactions, which types of customers and output attributes he/she is interested in customer data to enrich the transactions, e.g. the demographic and financial data of the customers making the transactions, their profiles, habits or other transactions Using the system user input parameters, the system identifies the points of interest directly given their ids (e.g. given the combination of id and name of the terminal) or based on a categorization procedure.

Stage 2. The transaction data is subsequently enriched by joining with the other data. Subsequently, the privacy mechanism is applied. The privacy mechanism takes into account the settings, and only the attributes and filters that comply with it are allowed to pass through. Some of the attributes/filters might need to be more generalized to be allowed to pass. Again, a filter refers to a desired attribute or field that is specified by the system user, and may or may not appear as such in the raw transaction data or the other data. This type of "filtering" is to be distinguished from the concept of "privacy filtering". Examples of such a filter are a gender, e.g. "Male" or "Female", or a day of the week, e.g. "Sunday", as shown in FIG. 20.

Stage 3. The attributes that passed the privacy mechanism land in the attribute layer. This is a stage where all attributes are stored that give information about e.g. sales in individual stores of the brand of the system user, sales of other brands, profiles of customers in own or other shops in different age groups or at different times of the day. The attributes can be prepared on different levels of detail, e.g. one store, one region or all the stores in one category/industry. In a preferred embodiment, the comparison layer can create new metrics from combinations of attributes, e.g. the market share of a given brand, average age of all men versus all women. Preferably, it can also forecast sales in the next periods or watch trends by comparing sales in different points in history for different market players.

Stage 4. Finally, the visualization layer prepares the insights to be consumed by the system user in forms of charts, tables and written insights. Preferably, the insights can be served via an interactive computer application and/or via a generated report and/or via consultation with a bank expert.

What is claimed is:

1. A computing system for obtaining a privacy-filtered response to a query of a system user, the computing system comprising:

a server, the server comprising a server processor, tangible non-volatile server memory, server program code present on said server memory to instruct said server processor;

a computer-readable medium, the computer-readable medium comprising a database, said database comprising privacy settings comprising a privacy threshold; and a device, said device comprising a device processor, tangible non-volatile device memory, and device program code present on said device memory to instruct said device processor;

wherein said server is configured to receive raw transaction data from an external source including a raw transaction database or a raw transaction feed, said raw transaction data comprising a plurality of raw transactions associated with a plurality of users, wherein said server is configured to receive said query of said system user via said device;

said computing system configured to obtain said privacy-filtered response to said query of said system user, said query relating to a company comprising one or more stores, said company relating to a plurality of products or services offered to one or more users via said one or more stores, at least one of said plurality of products or services relating to one or more brands, said query comprising query-related information including a store name or a brand name, said system further configured to:

receive said query from said system user via said device, said query relating to at least one of said stores at least one of said brands;

query said raw transaction data based on said query, obtaining raw query results;

process said raw query results, obtaining a response; and return said response to said system user via said device;

wherein said database comprises business data, said business data comprising at least one of user information company information; wherein said response concerns said privacy-filtered response; and wherein said system is configured to process said raw query results by:

extending said raw query results with extension data based at least on said business data and, optionally, based on said query-related information, obtaining enriched transaction data; and filtering said enriched transaction data based at least on said privacy threshold, obtaining said privacy-filtered response, wherein said system is configured to filter the enriched transaction data by:

(i) tokenizing said enriched transaction data with a token, obtaining aggregation-ready transaction data;

(ii) aggregating said aggregation-ready transaction data, obtaining aggregated transaction data, whereby each portion of said aggregated transaction data belongs to at least one provisional aggregate;

(iii) performing a threshold test for each of said provisional aggregates and discarding a portion of the aggregated transaction data belonging to said provisional aggregates for which a number of unique users is below a threshold parameter, obtaining threshold-tested transaction data, whereby each portion of said threshold-tested transaction data belongs to at least one threshold-tested aggregate;

(iv) performing an anonymity test for each of said threshold-tested aggregates and obtaining anonymity-tested transaction data, moving to step (v) in response to the anonymity test being negative and, otherwise, jumping to step (vi);

(v) reducing a level of detail of said anonymity-tested transaction data and obtaining said aggregation-ready transaction data, jumping to step (ii);

(vi) categorizing said anonymity-tested transaction data using a rule, obtaining categorized transaction data; and (vii) deriving tailored transaction data from said categorized transaction data;

whereby said enriched transaction data and said privacy-filtered response are organized in fields and entries; and whereby said filtering the enriched transaction data comprises a generalization of at least one entry of said enriched transaction data for preventing identification of a user relating to said entry.

2. The computing system according to claim 1, wherein said filtering the enriched transaction data relates to at least one of k-anonymity or t-closeness, wherein said k-anonymity includes a parameter k, wherein said t-closeness includes a parameter t, and wherein said parameter k and said parameter t are based at least partly on said privacy threshold.

3. The computing system according to claim 1, wherein said query relates to a store-specific selection of raw transactions relevant to at least one of said stores; and wherein said business data comprises at least one of demographic data, financial data, profile data, or habit data relating to users associated with raw transactions belonging to said store-specific selection.

4. The computing system according to claim 1, wherein said query relates to a brand-specific selection of raw transactions relevant to at least one of said brands; and wherein said business data comprises at least one of demographic data, financial data, profile data, or habit data relating to users associated with raw transactions belonging to said brand-specific selection.

5. The computing system according to claim 1, wherein said filtering the enriched transaction data comprises exclusion of privacy sensitive data.

6. The computing system according to claim 1, wherein said raw query results comprised in said enriched transaction data is tokenized independently of said extension data, obtaining tokenized raw query results, and wherein said extension data is tokenized independently of said raw query results, obtaining tokenized extension data.

7. The computing system according to claim 6, wherein said aggregation-ready transaction data is obtained by joining said tokenized raw query results with said tokenized extension data, optionally by using said token to link tokenized raw query results to said tokenized extension data.

8. The computing system according to claim 1, wherein said threshold-tested transaction data obtained in step (iii) comprises aggregate-linking data, whereby said aggregate-linking data is optionally obtained by using said token to link a first portion of said aggregated transaction data belonging to a first of said provisional aggregates to a second portion of said aggregated transaction data belonging to a second of said provisional aggregates.

9. The computing system according to claim 1, wherein said system is further configured to generate a visualization belonging to said privacy-filtered response, said visualization comprising a comparison with respect to two or more fields comprised in said privacy-filtered response.

10. The computing system according to claim 1, wherein said raw transaction data comprises data that is received in real-time over a network.

11. The computing system according to claim 1, wherein said system further comprises a web interface comprising a graphical user interface (GUI) configured to display to said system user via said device.

12. The computing system according to claim 1, wherein said device further comprises at least one of a display to visualize said privacy-filtered response, a printer configured to produce a printout of said privacy-filtered response, or a storage medium configured to store an electronic data file comprising said privacy-filtered response.

13. A privacy-filtered response product produced by the system according to claim 12, said privacy-filtered response product comprising any or any combination of the following: said print-out of said privacy-filtered response or said electronic data file comprising said privacy-filtered response.

14. The computing system according to claim 1, wherein said tokenizing in step (i), comprises exclusion of privacy sensitive data.

15. A computer program product for a device belonging to a system for obtaining a privacy-filtered response to a query of a system user, said computer program product comprising at least one non-transitory computer-readable medium comprising computer-readable program portions, said program portions containing instructions for causing the device to execute a user device method for obtaining a privacy-filtered response to a query of a system user, said query relating to a company comprising one or more stores, said company relating to a plurality of products or services offered to one or more users via said one or more stores, at least one of said plurality of products or services relating to one or more brands, said query comprising query-related information including a store name or a brand name, said user device method comprising:

receiving said query from said system user via said device, said query relating to at least one of said stores or at least one of said brands;

sending said query to a server;

processing said query using said server; and receiving a response that concerns said privacy-filtered response on said device from said server;

wherein a database comprises privacy settings, a privacy threshold, and business data, said business data comprising at least one of user information or company information; and wherein said processing said query using said server comprises:

extending a raw query results with extension data based at least on said business data and, optionally, based on said query-related information, obtaining enriched transaction data, wherein the raw query results are based on raw transaction data;

filtering said enriched transaction data based at least on said privacy threshold, obtaining said privacy-filtered response by:

(i) tokenizing said enriched transaction data with a token, obtaining aggregation-ready transaction data;

(ii) aggregating said aggregation-ready transaction data, obtaining aggregated transaction data, whereby each portion of said aggregated transaction data belongs to at least one provisional aggregate;

(iii) performing a threshold test for each of said provisional aggregates and discarding a portion of the aggregated transaction data belonging to said provisional aggregates for which a number of unique users is below a threshold parameter, obtaining threshold-tested transaction data, whereby each portion of said threshold-tested transaction data belongs to at least one threshold-tested aggregate;

(iv) performing an anonymity test for each of said threshold-tested aggregates and obtaining anonymity-tested transaction data, moving to step (v) in response to the anonymity test being negative and, otherwise, jumping to step (vi);

(v) reducing a level of detail of said anonymity-tested transaction data and obtaining said aggregation-ready transaction data, jumping to step (ii);

(vi) categorizing said anonymity-tested transaction data using a rule, obtaining categorized transaction data; and (vii) deriving tailored transaction data from said categorized transaction data;

whereby said enriched transaction data and said privacy-filtered response are organized in fields and entries; and whereby said filtering of said enriched transaction data comprises a generalization of at least one entry of said enriched transaction data for preventing identification of a user relating to said entry.

* * * * *